(12) United States Patent
Lavoie et al.

(10) Patent No.: US 9,592,851 B2
(45) Date of Patent: Mar. 14, 2017

(54) CONTROL MODES FOR A TRAILER BACKUP ASSIST SYSTEM

(71) Applicant: Ford Global Technologies, LLC, Dearborn, MI (US)

(72) Inventors: Erick Michael Lavoie, Dearborn, MI (US); Douglas Scott Rhode, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/312,021

(22) Filed: Jun. 23, 2014

(65) Prior Publication Data

US 2015/0367886 A1    Dec. 24, 2015

Related U.S. Application Data

(63) Continuation-in-part of application No. 14/310,039, filed on Jun. 20, 2014.

(51) Int. Cl.
| | | |
|---|---|---|
| *B62D 6/00* | (2006.01) | |
| *B62D 12/00* | (2006.01) | |
| *B62D 13/06* | (2006.01) | |
| *B62D 15/02* | (2006.01) | |

(52) U.S. Cl.
CPC ......... *B62D 13/06* (2013.01); *B62D 15/0275* (2013.01)

(58) Field of Classification Search
CPC ........................... B62D 13/06; B62D 15/0275
See application file for complete search history.

(56) References Cited

U.S. PATENT DOCUMENTS

| | | | |
|---|---|---|---|
| 3,605,088 A | 9/1971 | Savelli | |
| 3,833,928 A | 9/1974 | Gavit et al. | |
| 3,924,257 A | 12/1975 | Roberts | |
| 4,044,706 A | 8/1977 | Gill | |

(Continued)

FOREIGN PATENT DOCUMENTS

| | | |
|---|---|---|
| CN | 101610420 A | 12/2009 |
| CN | 101833869 A | 9/2010 |

(Continued)

OTHER PUBLICATIONS

"Ford Super Duty: Truck Technology", Brochure, www.media.ford.com, Sep. 2011, pp. 1-2.

(Continued)

*Primary Examiner* — Mary Cheung
(74) *Attorney, Agent, or Firm* — Raymond Coppiellie; Price Heneveld LLP

(57) ABSTRACT

A trailer backup assist system, according to one embodiment, provides a sensor that senses a hitch angle between a trailer and a vehicle. The trailer backup assist system also provides a selection device for selecting a longitudinal direction of the trailer or the vehicle in a static orientation. Further, the trailer backup assist system provides a controller that generates a steering command to the vehicle when reversing based on the hitch angle to guide the trailer in the selected longitudinal direction. The controller determines a kinematic relationship of the trailer and the vehicle based on a length of the trailer and a wheelbase of the vehicle, whereby the steering command is generated based on the kinematic relationship.

20 Claims, 11 Drawing Sheets

(56) References Cited

U.S. PATENT DOCUMENTS

| | | | |
|---|---|---|---|
| 4,430,637 A | 2/1984 | Koch-Ducker et al. | |
| 4,846,094 A | 7/1989 | Woods | |
| 4,848,499 A | 7/1989 | Martinet et al. | |
| 4,897,642 A | 1/1990 | DiLullo et al. | |
| 4,947,097 A | 8/1990 | Tao | |
| 5,097,250 A | 3/1992 | Hernandez | |
| 5,132,851 A | 7/1992 | Bomar et al. | |
| 5,155,683 A | 10/1992 | Rahim | |
| 5,191,328 A | 3/1993 | Nelson | |
| 5,235,316 A | 8/1993 | Qualizza | |
| 5,247,442 A | 9/1993 | Kendall | |
| 5,455,557 A | 10/1995 | Noll et al. | |
| 5,461,357 A | 10/1995 | Yoshioka et al. | |
| 5,650,764 A | 7/1997 | McCullough | |
| 5,690,347 A | 11/1997 | Juergens et al. | |
| 5,734,336 A | 3/1998 | Smithline | |
| 5,781,662 A | 7/1998 | Mori et al. | |
| 5,905,433 A | 5/1999 | Wortham | |
| 5,951,035 A | 9/1999 | Phillips, Jr. et al. | |
| 5,957,232 A | 9/1999 | Shimizu et al. | |
| 5,999,091 A | 12/1999 | Wortham | |
| 6,041,582 A | 3/2000 | Tiede et al. | |
| 6,100,795 A | 8/2000 | Otterbacher et al. | |
| 6,178,650 B1 | 1/2001 | Thibodeaux | |
| 6,182,010 B1 | 1/2001 | Berstis | |
| 6,198,992 B1 | 3/2001 | Winslow | |
| 6,226,226 B1 | 5/2001 | Lill et al. | |
| 6,351,698 B1 | 2/2002 | Kubota et al. | |
| 6,366,202 B1 | 4/2002 | Rosenthal | |
| 6,411,898 B2 | 6/2002 | Ishida et al. | |
| 6,434,486 B1 | 8/2002 | Studt et al. | |
| 6,480,104 B1 | 11/2002 | Wall et al. | |
| 6,483,429 B1 | 11/2002 | Yasui et al. | |
| 6,526,335 B1 | 2/2003 | Treyz et al. | |
| 6,539,288 B2 | 3/2003 | Ishida et al. | |
| 6,573,833 B1 | 6/2003 | Rosenthal | |
| 6,577,952 B2 | 6/2003 | Geier et al. | |
| 6,580,984 B2 | 6/2003 | Fecher et al. | |
| 6,604,592 B2 | 8/2003 | Pietsch et al. | |
| 6,643,576 B1 | 11/2003 | O Connor et al. | |
| 6,683,539 B2 | 1/2004 | Trajkovic et al. | |
| 6,801,125 B1 | 10/2004 | McGregor et al. | |
| 6,816,765 B2 | 11/2004 | Yamamoto et al. | |
| 6,837,432 B2 | 1/2005 | Tsikos et al. | |
| 6,847,916 B1 | 1/2005 | Ying | |
| 6,854,557 B1 * | 2/2005 | Deng | B62D 7/159 180/235 |
| 6,857,494 B2 | 2/2005 | Kobayashi et al. | |
| 6,933,837 B2 | 8/2005 | Gunderson et al. | |
| 6,959,970 B2 | 11/2005 | Tseng | |
| 6,970,184 B2 | 11/2005 | Hirama et al. | |
| 6,989,739 B2 | 1/2006 | Li | |
| 7,005,974 B2 | 2/2006 | McMahon et al. | |
| 7,026,957 B2 | 4/2006 | Rubenstein | |
| 7,047,117 B2 | 5/2006 | Akiyama et al. | |
| 7,085,634 B2 | 8/2006 | Endo et al. | |
| 7,089,101 B2 | 8/2006 | Fischer et al. | |
| 7,136,754 B2 | 11/2006 | Hahn et al. | |
| 7,142,098 B2 | 11/2006 | Lang et al. | |
| 7,154,385 B2 | 12/2006 | Lee et al. | |
| 7,161,616 B1 | 1/2007 | Okamoto et al. | |
| 7,175,194 B2 | 2/2007 | Ball | |
| 7,204,504 B2 | 4/2007 | Gehring et al. | |
| 7,207,041 B2 | 4/2007 | Elson et al. | |
| 7,220,217 B2 | 5/2007 | Tamai et al. | |
| 7,225,891 B2 | 6/2007 | Gehring et al. | |
| 7,229,139 B2 | 6/2007 | Lu et al. | |
| 7,239,958 B2 | 7/2007 | Grougan et al. | |
| 7,266,435 B2 | 9/2007 | Wang et al. | |
| 7,309,075 B2 | 12/2007 | Ramsey et al. | |
| 7,310,084 B2 | 12/2007 | Shitanaka et al. | |
| 7,315,299 B2 | 1/2008 | Sunda et al. | |
| 7,319,927 B1 | 1/2008 | Sun et al. | |
| 7,352,388 B2 | 4/2008 | Miwa et al. | |
| 7,353,110 B2 | 4/2008 | Kim | |
| 7,366,892 B2 | 4/2008 | Spaur et al. | |
| 7,401,871 B2 | 7/2008 | Lu et al. | |
| 7,425,889 B2 | 9/2008 | Widmann et al. | |
| 7,451,020 B2 | 11/2008 | Goetting et al. | |
| 7,463,137 B2 | 12/2008 | Wishart et al. | |
| 7,505,784 B2 | 3/2009 | Barbera | |
| 7,537,256 B2 | 5/2009 | Gates et al. | |
| 7,552,009 B2 | 6/2009 | Nelson | |
| 7,602,782 B2 | 10/2009 | Doviak et al. | |
| 7,623,952 B2 | 11/2009 | Unruh et al. | |
| 7,640,108 B2 | 12/2009 | Shimizu et al. | |
| 7,689,253 B2 | 3/2010 | Basir | |
| 7,690,737 B2 | 4/2010 | Lu | |
| 7,692,557 B2 | 4/2010 | Medina et al. | |
| 7,693,661 B2 | 4/2010 | Iwasaka | |
| 7,715,953 B2 | 5/2010 | Shepard | |
| 7,777,615 B2 | 8/2010 | Okuda et al. | |
| 7,783,699 B2 | 8/2010 | Rasin et al. | |
| 7,786,849 B2 | 8/2010 | Buckley | |
| 7,801,941 B2 | 9/2010 | Conneely et al. | |
| 7,825,782 B2 | 11/2010 | Hermann | |
| 7,827,047 B2 | 11/2010 | Anderson et al. | |
| 7,840,347 B2 | 11/2010 | Noguchi | |
| 7,904,222 B2 | 3/2011 | Lee et al. | |
| 7,907,975 B2 | 3/2011 | Sakamoto et al. | |
| 7,917,081 B2 | 3/2011 | Voto et al. | |
| 7,932,623 B2 | 4/2011 | Burlak et al. | |
| 7,932,815 B2 | 4/2011 | Martinez et al. | |
| 7,950,751 B2 | 5/2011 | Offerle et al. | |
| 7,969,326 B2 | 6/2011 | Sakakibara | |
| 7,974,444 B2 | 7/2011 | Hongo | |
| 8,009,025 B2 | 8/2011 | Engstrom et al. | |
| 8,010,252 B2 | 8/2011 | Getman et al. | |
| 8,019,592 B2 | 9/2011 | Fukuoka et al. | |
| 8,024,743 B2 | 9/2011 | Werner | |
| 8,033,955 B2 | 10/2011 | FarNsworth | |
| 8,036,792 B2 | 10/2011 | Dechamp | |
| 8,037,500 B2 | 10/2011 | Margis et al. | |
| 8,038,166 B1 | 10/2011 | Piesinger | |
| 8,044,776 B2 | 10/2011 | Schofield et al. | |
| 8,044,779 B2 | 10/2011 | Hahn et al. | |
| 8,121,802 B2 | 2/2012 | Grider et al. | |
| 8,131,458 B1 | 3/2012 | Zilka | |
| 8,140,138 B2 | 3/2012 | Chrumka | |
| 8,150,474 B2 | 4/2012 | Saito et al. | |
| 8,165,770 B2 | 4/2012 | Getman et al. | |
| 8,169,341 B2 | 5/2012 | Toledo et al. | |
| 8,174,576 B2 | 5/2012 | Akatsuka et al. | |
| 8,179,238 B2 | 5/2012 | Roberts, Sr. et al. | |
| 8,195,145 B2 | 6/2012 | Angelhag | |
| 8,205,704 B2 | 6/2012 | Kadowaki et al. | |
| 8,244,442 B2 | 8/2012 | Craig et al. | |
| 8,245,270 B2 | 8/2012 | Cooperstein et al. | |
| 8,255,007 B2 | 8/2012 | Saito et al. | |
| 8,267,485 B2 | 9/2012 | Barlsen et al. | |
| 8,270,933 B2 | 9/2012 | Riemer et al. | |
| 8,280,607 B2 | 10/2012 | Gatti et al. | |
| 8,308,182 B2 | 11/2012 | Ortmann et al. | |
| 8,310,353 B2 | 11/2012 | Hinninger et al. | |
| 8,315,617 B2 | 11/2012 | Tadayon et al. | |
| 8,319,618 B2 | 11/2012 | Gomi et al. | |
| 8,319,663 B2 | 11/2012 | Von Reyher et al. | |
| 8,352,575 B2 | 1/2013 | Samaha | |
| 8,362,888 B2 | 1/2013 | Roberts, Sr. et al. | |
| 8,370,056 B2 | 2/2013 | Trombley et al. | |
| 8,374,749 B2 | 2/2013 | Tanaka | |
| 8,380,416 B2 | 2/2013 | Offerle et al. | |
| 8,392,066 B2 | 3/2013 | Ehara et al. | |
| 8,401,744 B2 | 3/2013 | Chiocco | |
| 8,406,956 B2 | 3/2013 | Wey et al. | |
| 8,417,263 B2 | 4/2013 | Jenkins et al. | |
| 8,417,417 B2 | 4/2013 | Chen et al. | |
| 8,417,444 B2 | 4/2013 | Smid et al. | |
| 8,427,288 B2 | 4/2013 | Schofield et al. | |
| 8,451,107 B2 | 5/2013 | Lu et al. | |
| 8,471,691 B2 | 6/2013 | Zhang et al. | |
| 8,473,575 B2 | 6/2013 | Marchwicki et al. | |
| 8,494,439 B2 | 7/2013 | Faenger | |
| 8,498,757 B2 | 7/2013 | Bowden et al. | |

(56) References Cited

U.S. PATENT DOCUMENTS

| | | |
|---|---|---|
| 8,538,785 B2 | 9/2013 | Coleman et al. |
| 8,548,680 B2 | 10/2013 | Ryerson et al. |
| 8,560,175 B2 | 10/2013 | Bammert et al. |
| 8,571,758 B2 | 10/2013 | Klier et al. |
| 8,626,382 B2 | 1/2014 | Obradovich |
| 8,755,984 B2 | 6/2014 | Rupp et al. |
| 8,786,417 B2 | 7/2014 | Holmen et al. |
| 8,788,204 B2 | 7/2014 | Shimizu |
| 8,797,190 B2 | 8/2014 | Kolbe et al. |
| 8,798,860 B2 | 8/2014 | Dechamp |
| 8,807,261 B2 | 8/2014 | Subrt et al. |
| 8,823,796 B2 | 9/2014 | Shen et al. |
| 8,868,329 B2 | 10/2014 | Ikeda et al. |
| 8,888,120 B2 | 11/2014 | Trevino |
| 8,892,360 B2 | 11/2014 | Otani |
| 8,909,426 B2 | 12/2014 | Rhode et al. |
| 8,928,757 B2 | 1/2015 | Maekawa et al. |
| 8,930,140 B2 | 1/2015 | Trombley et al. |
| 9,008,913 B1 | 4/2015 | Sears et al. |
| 9,013,286 B2 | 4/2015 | Chen et al. |
| 9,042,603 B2 | 5/2015 | Elwart et al. |
| 9,082,315 B2 | 7/2015 | Lin et al. |
| 9,094,583 B2 | 7/2015 | Shih et al. |
| 9,102,271 B2 | 8/2015 | Trombley et al. |
| 9,114,832 B2 | 8/2015 | Wang et al. |
| 9,120,359 B2 | 9/2015 | Chiu et al. |
| 9,132,856 B2 | 9/2015 | Shepard |
| 9,208,686 B2 | 12/2015 | Takamatsu |
| 9,248,858 B2 | 2/2016 | Lavoie et al. |
| 9,335,162 B2 | 5/2016 | Kyrtsos et al. |
| 9,352,777 B2 | 5/2016 | Lavoie et al. |
| 9,434,414 B2 | 9/2016 | Lavoie |
| 9,500,497 B2 | 11/2016 | Lavoie et al. |
| 2002/0005780 A1 | 1/2002 | Ehrlich et al. |
| 2002/0098853 A1 | 7/2002 | Chrumka |
| 2002/0111118 A1 | 8/2002 | Klitsner et al. |
| 2003/0079123 A1 | 4/2003 | Mas Ribes |
| 2003/0147534 A1 | 8/2003 | Ablay et al. |
| 2003/0222982 A1 | 12/2003 | Hamdan et al. |
| 2003/0234512 A1 | 12/2003 | Holub |
| 2004/0119822 A1 | 6/2004 | Custer et al. |
| 2004/0203660 A1 | 10/2004 | Tibrewal et al. |
| 2004/0207525 A1 | 10/2004 | Wholey et al. |
| 2004/0260438 A1 | 12/2004 | Chernetsky et al. |
| 2005/0000738 A1 | 1/2005 | Gehring et al. |
| 2005/0055138 A1* | 3/2005 | Lee .................. G05D 1/0891 701/1 |
| 2005/0073433 A1 | 4/2005 | Gunderson et al. |
| 2005/0074143 A1 | 4/2005 | Kawai |
| 2005/0091408 A1 | 4/2005 | Parupudi et al. |
| 2005/0128059 A1 | 6/2005 | Vause |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0206225 A1 | 9/2005 | Offerle et al. |
| 2005/0206231 A1 | 9/2005 | Lu et al. |
| 2005/0206299 A1 | 9/2005 | Nakamura et al. |
| 2005/0236201 A1 | 10/2005 | Spannheimer et al. |
| 2005/0236896 A1 | 10/2005 | Offerle et al. |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0156315 A1 | 7/2006 | Wood et al. |
| 2006/0190097 A1 | 8/2006 | Rubenstein |
| 2006/0238538 A1 | 10/2006 | Kapler et al. |
| 2006/0244579 A1 | 11/2006 | Raab |
| 2006/0250501 A1 | 11/2006 | Widmann et al. |
| 2006/0276959 A1 | 12/2006 | Matsuoka et al. |
| 2006/0287821 A1 | 12/2006 | Lin |
| 2006/0293800 A1 | 12/2006 | Bauer et al. |
| 2007/0027581 A1 | 2/2007 | Bauer et al. |
| 2007/0057816 A1 | 3/2007 | Sakakibara et al. |
| 2007/0132560 A1 | 6/2007 | Nystrom et al. |
| 2007/0132573 A1 | 6/2007 | Quach et al. |
| 2007/0198190 A1 | 8/2007 | Bauer et al. |
| 2007/0216136 A1 | 9/2007 | Dietz |
| 2007/0260395 A1 | 11/2007 | Matsuoka et al. |
| 2008/0027599 A1 | 1/2008 | Logan et al. |
| 2008/0027635 A1 | 1/2008 | Tengler et al. |
| 2008/0148374 A1 | 6/2008 | Spaur et al. |
| 2008/0177443 A1 | 7/2008 | Lee et al. |
| 2008/0180526 A1 | 7/2008 | Trevino |
| 2008/0186384 A1 | 8/2008 | Ishii et al. |
| 2008/0231701 A1 | 9/2008 | Greenwood et al. |
| 2008/0312792 A1 | 12/2008 | Dechamp |
| 2008/0313050 A1 | 12/2008 | Basir |
| 2009/0005932 A1 | 1/2009 | Lee et al. |
| 2009/0045924 A1 | 2/2009 | Roberts, Sr. et al. |
| 2009/0063053 A1 | 3/2009 | Basson et al. |
| 2009/0075624 A1 | 3/2009 | Cox et al. |
| 2009/0079828 A1 | 3/2009 | Lee et al. |
| 2009/0082935 A1 | 3/2009 | Leschuk et al. |
| 2009/0093928 A1 | 4/2009 | Getman et al. |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0219147 A1 | 9/2009 | Bradley et al. |
| 2009/0253466 A1 | 10/2009 | Saito et al. |
| 2009/0271078 A1 | 10/2009 | Dickinson |
| 2009/0306854 A1 | 12/2009 | Dechamp |
| 2009/0318119 A1 | 12/2009 | Basir et al. |
| 2010/0060739 A1 | 3/2010 | Salazar |
| 2010/0063670 A1 | 3/2010 | Brzezinski et al. |
| 2010/0098853 A1 | 4/2010 | Hoffmann et al. |
| 2010/0114471 A1 | 5/2010 | Sugiyama et al. |
| 2010/0152989 A1 | 6/2010 | Smith et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0174422 A1 | 7/2010 | Jacobsen et al. |
| 2010/0191421 A1 | 7/2010 | Nilsson |
| 2010/0198491 A1 | 8/2010 | Mays |
| 2010/0222964 A1 | 9/2010 | Dechamp |
| 2010/0234071 A1 | 9/2010 | Shabtay et al. |
| 2010/0305815 A1 | 12/2010 | Trueman et al. |
| 2010/0306309 A1 | 12/2010 | Santori et al. |
| 2010/0324770 A1 | 12/2010 | Ramsey et al. |
| 2011/0022282 A1 | 1/2011 | Wu et al. |
| 2011/0025482 A1 | 2/2011 | Alguera et al. |
| 2011/0063425 A1 | 3/2011 | Tieman |
| 2011/0088659 A1 | 4/2011 | Wang et al. |
| 2011/0102583 A1 | 5/2011 | Kinzalow |
| 2011/0110530 A1 | 5/2011 | Kimura |
| 2011/0112721 A1 | 5/2011 | Wang et al. |
| 2011/0112762 A1 | 5/2011 | Gruijters et al. |
| 2011/0125457 A1 | 5/2011 | Lee et al. |
| 2011/0129093 A1 | 6/2011 | Karam et al. |
| 2011/0140872 A1 | 6/2011 | McClure |
| 2011/0149077 A1 | 6/2011 | Robert |
| 2011/0153198 A1 | 6/2011 | Kokkas et al. |
| 2011/0160956 A1 | 6/2011 | Chung et al. |
| 2011/0181457 A1 | 7/2011 | Basten |
| 2011/0185390 A1 | 7/2011 | Faenger et al. |
| 2011/0195659 A1 | 8/2011 | Boll et al. |
| 2011/0216199 A1 | 9/2011 | Trevino et al. |
| 2011/0257860 A1 | 10/2011 | Getman et al. |
| 2011/0281522 A1 | 11/2011 | Suda |
| 2011/0296037 A1 | 12/2011 | Westra et al. |
| 2012/0004805 A1 | 1/2012 | Gray et al. |
| 2012/0062743 A1 | 3/2012 | Lynam et al. |
| 2012/0062744 A1 | 3/2012 | Schofield et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0086808 A1 | 4/2012 | Lynam et al. |
| 2012/0095649 A1 | 4/2012 | Klier et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0224059 A1 | 9/2012 | Takamatsu |
| 2012/0265416 A1 | 10/2012 | Lu et al. |

(56) References Cited

U.S. PATENT DOCUMENTS

| | | | |
|---|---|---|---|
| 2012/0271512 A1* | 10/2012 | Rupp | B62D 13/06 701/41 |
| 2012/0271514 A1 | 10/2012 | Lavoie et al. | |
| 2012/0271515 A1* | 10/2012 | Rhode | B62D 1/22 701/42 |
| 2012/0271522 A1 | 10/2012 | Rupp et al. | |
| 2012/0283909 A1 | 11/2012 | Dix | |
| 2012/0283910 A1 | 11/2012 | Lee et al. | |
| 2012/0288156 A1 | 11/2012 | Kido | |
| 2012/0290150 A1 | 11/2012 | Doughty et al. | |
| 2012/0314073 A1 | 12/2012 | Shimoda et al. | |
| 2012/0316732 A1 | 12/2012 | Auer | |
| 2013/0006472 A1 | 1/2013 | McClain et al. | |
| 2013/0024064 A1* | 1/2013 | Shepard | B62D 13/06 701/23 |
| 2013/0027195 A1 | 1/2013 | Van Wiemeersch et al. | |
| 2013/0038436 A1 | 2/2013 | Brey et al. | |
| 2013/0041524 A1 | 2/2013 | Brey | |
| 2013/0057397 A1 | 3/2013 | Cutler et al. | |
| 2013/0076007 A1 | 3/2013 | Goode et al. | |
| 2013/0148748 A1 | 6/2013 | Suda | |
| 2013/0158803 A1 | 6/2013 | Headley | |
| 2013/0158863 A1 | 6/2013 | Skvarce et al. | |
| 2013/0179038 A1* | 7/2013 | Goswami | B62D 13/005 701/42 |
| 2013/0226390 A1 | 8/2013 | Luo et al. | |
| 2013/0250114 A1 | 9/2013 | Lu | |
| 2013/0253814 A1 | 9/2013 | Wirthlin | |
| 2013/0268160 A1* | 10/2013 | Trombley | B62D 15/027 701/42 |
| 2014/0005918 A1 | 1/2014 | Qiang | |
| 2014/0012465 A1 | 1/2014 | Shank et al. | |
| 2014/0025260 A1 | 1/2014 | McClure | |
| 2014/0052337 A1 | 2/2014 | Lavoie et al. | |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0074743 A1 | 3/2014 | Rademaker | |
| 2014/0085472 A1 | 3/2014 | Lu et al. | |
| 2014/0088797 A1 | 3/2014 | McClain et al. | |
| 2014/0088824 A1 | 3/2014 | Ishimoto | |
| 2014/0121883 A1 | 5/2014 | Shen et al. | |
| 2014/0121930 A1 | 5/2014 | Allexi et al. | |
| 2014/0156148 A1 | 6/2014 | Kikuchi | |
| 2014/0160276 A1 | 6/2014 | Pliefke et al. | |
| 2014/0172232 A1 | 6/2014 | Rupp et al. | |
| 2014/0188344 A1 | 7/2014 | Lavoie | |
| 2014/0188346 A1 | 7/2014 | Lavoie | |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0267727 A1 | 9/2014 | Alaniz | |
| 2014/0267868 A1 | 9/2014 | Mazzola et al. | |
| 2014/0267869 A1 | 9/2014 | Sawa | |
| 2014/0277941 A1 | 9/2014 | Chiu et al. | |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0309888 A1 | 10/2014 | Smit et al. | |
| 2014/0324295 A1 | 10/2014 | Lavoie et al. | |
| 2014/0343795 A1 | 11/2014 | Lavoie | |
| 2014/0358429 A1 | 12/2014 | Shutko et al. | |
| 2014/0361955 A1 | 12/2014 | Goncalves | |
| 2014/0379217 A1 | 12/2014 | Rupp et al. | |
| 2015/0002670 A1 | 1/2015 | Bajpai | |
| 2015/0057903 A1 | 2/2015 | Rhode et al. | |
| 2015/0066296 A1 | 3/2015 | Trombley et al. | |
| 2015/0094945 A1 | 4/2015 | Cheng et al. | |
| 2015/0115571 A1 | 4/2015 | Zhang et al. | |
| 2015/0120141 A1 | 4/2015 | Lavoie et al. | |
| 2015/0120143 A1 | 4/2015 | Schlichting | |
| 2015/0134183 A1 | 5/2015 | Lavoie et al. | |
| 2015/0138340 A1 | 5/2015 | Lavoie | |
| 2015/0142211 A1 | 5/2015 | Shehata et al. | |
| 2015/0158527 A1 | 6/2015 | Hafner et al. | |
| 2015/0165850 A1 | 6/2015 | Chiu et al. | |
| 2015/0179075 A1 | 6/2015 | Lee | |
| 2015/0197278 A1 | 7/2015 | Boos et al. | |
| 2015/0203156 A1 | 7/2015 | Hafner et al. | |
| 2015/0210317 A1 | 7/2015 | Hafner et al. | |
| 2015/0217692 A1 | 8/2015 | Yanagawa | |
| 2015/0217693 A1 | 8/2015 | Pliefke et al. | |
| 2015/0232031 A1 | 8/2015 | Kitaura et al. | |
| 2015/0232092 A1 | 8/2015 | Fairgrieve et al. | |
| 2015/0234386 A1 | 8/2015 | Zini et al. | |
| 2016/0039456 A1 | 2/2016 | Lavoie et al. | |
| 2016/0059888 A1 | 3/2016 | Bradley et al. | |
| 2016/0152263 A1 | 6/2016 | Singh et al. | |
| 2016/0280267 A1 | 9/2016 | Lavoie et al. | |

FOREIGN PATENT DOCUMENTS

| | | |
|---|---|---|
| CN | 202541524 U | 11/2012 |
| DE | 3931518 A1 | 4/1991 |
| DE | 9208595 U1 | 8/1992 |
| DE | 10065230 A1 | 7/2002 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006035021 | 1/2008 |
| DE | 102006048947 A1 | 4/2008 |
| DE | 102008020838 A1 | 11/2008 |
| DE | 102009012253 A1 | 9/2010 |
| DE | 102010004920 A1 | 7/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102011108440 A1 | 1/2013 |
| EP | 0418653 A1 | 3/1991 |
| EP | 0849144 A2 | 6/1998 |
| EP | 1361543 A2 | 11/2003 |
| EP | 1695888 A2 | 8/2006 |
| EP | 1593552 B1 | 3/2007 |
| EP | 2168815 A1 | 3/2010 |
| EP | 2199188 A2 | 6/2010 |
| EP | 2452549 A1 | 5/2012 |
| EP | 2551132 A1 | 1/2013 |
| EP | 2644477 A1 | 10/2013 |
| EP | 1569073 B1 | 9/2014 |
| EP | 2803944 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 63-085568 | 6/1988 |
| JP | 06-028598 A | 4/1994 |
| JP | 2003148938 A | 5/2003 |
| JP | 2003175852 A | 6/2003 |
| JP | 2004114879 A | 4/2004 |
| JP | 3716722 B2 | 11/2005 |
| JP | 2008027138 A | 2/2008 |
| JP | 2008123028 A | 5/2008 |
| JP | 2009171122 A | 7/2009 |
| JP | 2012166647 A | 9/2012 |
| JP | 2014034289 A | 2/2014 |
| KR | 20060012710 A | 2/2006 |
| KR | 20060133750 A | 12/2006 |
| KR | 20110114897 A | 10/2011 |

(56) References Cited

FOREIGN PATENT DOCUMENTS

| KR | 20140105199 A | 9/2014 |
|---|---|---|
| TW | 200930010 A | 7/2009 |
| WO | 8503263 A1 | 8/1985 |
| WO | 2011117372 A1 | 9/2011 |
| WO | 2014019730 A1 | 2/2014 |
| WO | 2014037500 A1 | 3/2014 |
| WO | 2014123575 A1 | 8/2014 |
| WO | 2015074027 A1 | 5/2015 |

OTHER PUBLICATIONS

"Ford Guide to Towing", Trailer Life, Magazine, 2012, pp. 1-38.
"Dodge Dart: The Hot Compact Car", Brochure, www.dart-mouth.com/enginerring-development.html, pp. 1-6; date unknown.
M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.
Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.
"Understanding Tractor-Trailer Performance", Caterpillar, 2006, pp. 1-28.
Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.
Stahn, R.; Heiserich, G.; Stopp, A., "Laser Scanner-Based Navigation for Commercial Vehicles", IEEE, Intelligent Vehicles Symposium, Jun. 2007, pp. 969-974, print ISBN: 1931-0587.
Widrow, B.; Lamego, M.M., "Neurointerfaces: Applications", IEEE, Adaptive Systems for Signal Processing, Communications, and Control Symposium, Oct. 2000, pp. 441-444.
Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.
Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.
Ford Motor Company, "09 F-150", Brochure, www.fordvehicles.com, pp. 1-30; date unknown.
Michael Paine, "Heavy Vehicle Object Detection Systems", Vehicle Design and Research Pty Lmited for VicRoads, Jun. 2003, pp. 1-22.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
"2012 Edge—Trailer Towing Selector", Brochure, Preliminary 2012 RV & Trailer Towing Guide Information, pp. 1-3.
"Meritor Wabco Reverse Detection Module for Trailers with 12-Volt Constant Power Systems", Technical Bulletin, TP-02172, Revised Oct. 2004, pp. 1-8.
Simonoff, Adam J., "USH0001469 Remotely Piloted Vehicle Control and Interface System", Aug. 1, 1995, pp. 1-7.
"Range Rover Evoque's Surround Camera System"; MSN Douglas Newcomb Jun. 15, 2012, pp. 1-2.
"Electronic Trailer Steering", VSE, Advanced Steering & Suspension Solutions, Brochure, 2009, The Netherlands, pp. 1-28.
"WABCO Electronic Braking System—New Generation", Vehicle Control Systems—An American Standard Company, www.wabco-auto.com, 2004, pp. 1-8.
T. Wang, "Reverse-A-Matic-Wheel Direction Sensor System Operation and Installation Manual", Dec. 15, 2005, pp. 1-9.
"Wireless-Enabled Microphone, Speaker and User Interface for a Vehicle", The IP.com, Aug. 26, 2004, pp. 1-5, IP.com disclosure No. IPCOM000030782D.

"RFID Read/Write Module", Grand Idea Studio, 2013, pp. 1-3, website, http://www.grandideastudio.com/portfolio/rfid-read-write-module/.
Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.
"Convenience and Loadspace Features" Jaguar Land Rover Limited, 2012, pp. 1-15, http://www.landrover.com/us/en/lr/all-new-range-rover/explore/.
"Delphi Lane Departure Warning", Delphi Corporation, Troy, Michigan pp. 1-2; date unknown.
Micah Steele, R. Brent Gillespie, "Shared Control Between Human and Machine: Using a Haptic Steering Wheel to Aid in Land Vehicle Guidance", University of Michigan, pp. 1-5; date unknown.
"Electric Power Steering", Toyota Hybrid System Diagnosis—Course 072, Section 7, pp. 1-10; date unknown.
"Telematics Past, Present, and Future," Automotive Service Association, www.ASAshop.org, May 2008, 20 pgs.
"Fully Automatic Trailer Tow Hitch With LIN Bus," https://webista.bmw.com/webista/show?id=1860575499&lang=engb&print=1, pp. 1-5; date unknown.
Nüsser, René; Pelz, Rodolfo Mann, "Bluetooth-based Wireless Connectivity in an Automotive Environment", VTC, 2000, pp. 1935-1942.
Whitfield, Kermit, "A Hitchhiker's Guide to the Telematics Ecosystem", Automotive Design & Production, Oct. 1, 2003, 3 pgs.
Narasimhan, N.; Janssen, C.; Pearce, M.; Song, Y., "A Lightweight Remote Display Management Protocol for Mobile Devices", 2007, IEEE, pp. 711-715.
Microsoft, Navigation System, Sync Powered by Microsoft, Ford Motor Company, Jul. 2007, 164 pgs.
Microsoft, Supplemental Guide, Sync Powered by Microsoft, Ford Motor Company, Nov. 2007, 86 pgs.
Voelcker, J., "Top 10 Tech Cars: Its the Environment, Stupid", IEEE Spectrum, Apr. 2008, pp. 26-35.
Microsoft, Navigation System, Sync Powered by Microsoft, Ford Motor Company, Oct. 2008, 194 pgs.
Microsoft, Supplemental Guide, Sync Powered by Microsoft, Ford Motor Company, Oct. 2008, 83 pgs.
Chantry, Darryl, "Mapping Applications to the Cloud", Microsoft Corporation, Jan. 2009, 20 pgs.
Yarden, Raam; Surage Jr., Chris; Kim, Chong IL; Doboli, Alex; Voisan, Emil; Purcaru, Constantin, "TUKI: A Voice-Activated Information Browser", 2009, IEEE, pp. 1-5.
Gil-Castiñeira, Felipe; Chaves-Diéguez, David; González-Castaño, Francisco J., "Integration of Nomadic Devices with Automotive User Interfaces", IEEE Transactions on Consumer Electronics, Feb. 2009, vol. 55, Issue 1, pp. 34-41.
Microsoft, Navigation System, Sync Powered by Microsoft, Ford Motor Company, Jul. 2009, 196 pgs.
Microsoft, Supplemental Guide, Sync Powered by Microsoft, Ford Motor Company, Aug. 2009, 87 pgs.
Goodwin, Antuan, "Ford Unveils Open-Source Sync Developer Platform", The Car Tech Blog, Oct. 29, 2009, 5 pgs. [Retrieved from http://reviews.cnet.com/8301-13746_7-10385619-48.html on Feb. 15, 2011].
Lamberti , Ralf, "Full Circle: The Rise of Vehicle-Installed Telematics",Telematics Munich, Nov. 10, 2009, 12 pgs.
"Apple Files Patent Which Could Allow You to Control Your Computer Remotely Using iPhone", Dec. 18, 2009, 7 pgs [Retrieved from www.iphonehacks.com on Jun. 22, 2010].
Newmark, Zack, "Student develop in-car cloud computing apps; envision the future of in-car connectivity", May 4, 2010, 3 pgs [Retrieved from www.worldcarfans.com on Jun. 18, 2010].
"Service Discovery Protocol (SDP)", Palo Wireless Bluetooth Resource Center, 7 pgs [Retrieved from http://palowireless.com/infotooth/tutorial/sdp.asp on Aug. 3, 2010].
Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.

(56) References Cited

OTHER PUBLICATIONS

"MobileSafer makes it easy to keep connected and safe", ZoomSafer Inc., 2010, 5 pgs. [Retrieved from http://zoomsafer.com/products/mobilesafer on Dec. 28, 2010].
"PhonEnforcer FAQs", Turnoffthecellphone.com, 3 pgs. [Retrieved from http://turnoffthecellphone.com/faq.html on Dec. 28, 2010].
"How PhonEnforcer Works", Turnoffthecellphone.com, 2 pgs. [Retrieved from http://turnoffthecellphone.com/howitworks.htm on Dec. 28, 2010].
European Patent Office, European Search Report for Application No. EP11151623, Feb. 15, 2011, 7 pgs.
Wikipedia, "X Window System", Wikipedia, The Free Encyclopedia, date unknown, 19 pgs. [Retrieved from http://en.wikipedia.org/w/index.php?title=X_Window_System&oldid=639253038].
Jung-Hoon Hwang, Ronald C. Arkin, and Dong-Soo Kwon; "Mobile robots at your fingertip: Bezier curve on-line trajectory generation for supervisory control," IEEE/RSJ, International Conference on Intelligent Robots and Systems, Las Vegas, Nevada, Oct. 2003, 6 pages.
M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

\* cited by examiner

CONTROL MODES FOR A TRAILER BACKUP ASSIST SYSTEM

CROSS-REFERENCE TO RELATED APPLICATION

This patent application is a continuation-in-part of U.S. patent application Ser. No. 14/310,039, which was filed on Jun. 20, 2014, now U.S. Pat. No. 9,511,799, entitled "OBJECT AVOIDANCE FOR A TRAILER BACKUP ASSIST SYSTEM," which is a continuation-in-part of U.S. patent application No. 13/759,022, filed on Feb. 4, 2013, now U.S. Pat. No. 9,164,955, entitled "TRAILER ACTIVE BACK-UP ASSIST WITH OBJECT AVOIDANCE," hereby incorporated by reference in their entirety.

FIELD OF THE INVENTION

The disclosure made herein relates generally to driver assist and active safety technologies in vehicles, and more particularly to a trailer backup assist system that is configured with multiple modes to control guidance of the trailer.

BACKGROUND OF THE INVENTION

Reversing a vehicle while towing a trailer can be challenging for many drivers, particularly for drivers that drive with a trailer on an infrequent basis or with various types of trailers. One reason for such difficulty may be that backing a vehicle with an attached trailer requires steering inputs that are opposite to steering inputs when backing the vehicle without a trailer attached to the vehicle. Another reason for such difficulty may be that small errors in steering while backing a vehicle with an attached trailer are amplified, which may cause the trailer to quickly depart from a desired path. An additional reason backing a trailer can prove to be difficult is the need to control the vehicle in a manner that limits the potential for a jackknife condition to occur. A jackknife condition may occur when steering of the vehicle cannot control the hitch angle, such that the hitch angle would continue to increase and the vehicle must be pulled forward to relieve the hitch angle. However, in addition to the jackknife condition creating the inconvenient situation where the vehicle must be pulled forward, it can also lead to contact between the vehicle and trailer, thereby damaging the trailer and/or the vehicle.

SUMMARY OF THE INVENTION

According to one aspect of the present invention, a method is provided for reversing a trailer with a vehicle that includes determining a kinematic relationship of the trailer and the vehicle. The method also includes sensing a hitch angle between the trailer and the vehicle. In addition, the method includes selecting a static orientation of the trailer or the vehicle to define a reference path in line with the static orientation. Further, the method includes steering the vehicle to guide the trailer on the reference path based on the hitch angle and the kinematic relationship.

According to another aspect of the present invention, a method is provided for reversing a trailer with a vehicle that includes sensing a hitch angle between the trailer and the vehicle. The method also includes selecting a longitudinal direction of the trailer or the vehicle in a static orientation or a curvature based on the hitch angle in the static orientation to define a reference path. Further, the method includes steering the vehicle to guide the trailer on the reference path.

According to a further aspect of the present invention, a trailer backup assist system provides a sensor that senses a hitch angle between a trailer and a vehicle. The trailer backup assist system also provides a selection device for selecting a longitudinal direction of the trailer or the vehicle in a static orientation. Further, the trailer backup assist system provides a controller that generates a steering command to the vehicle when reversing based on the hitch angle to guide the trailer in the selected longitudinal direction.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
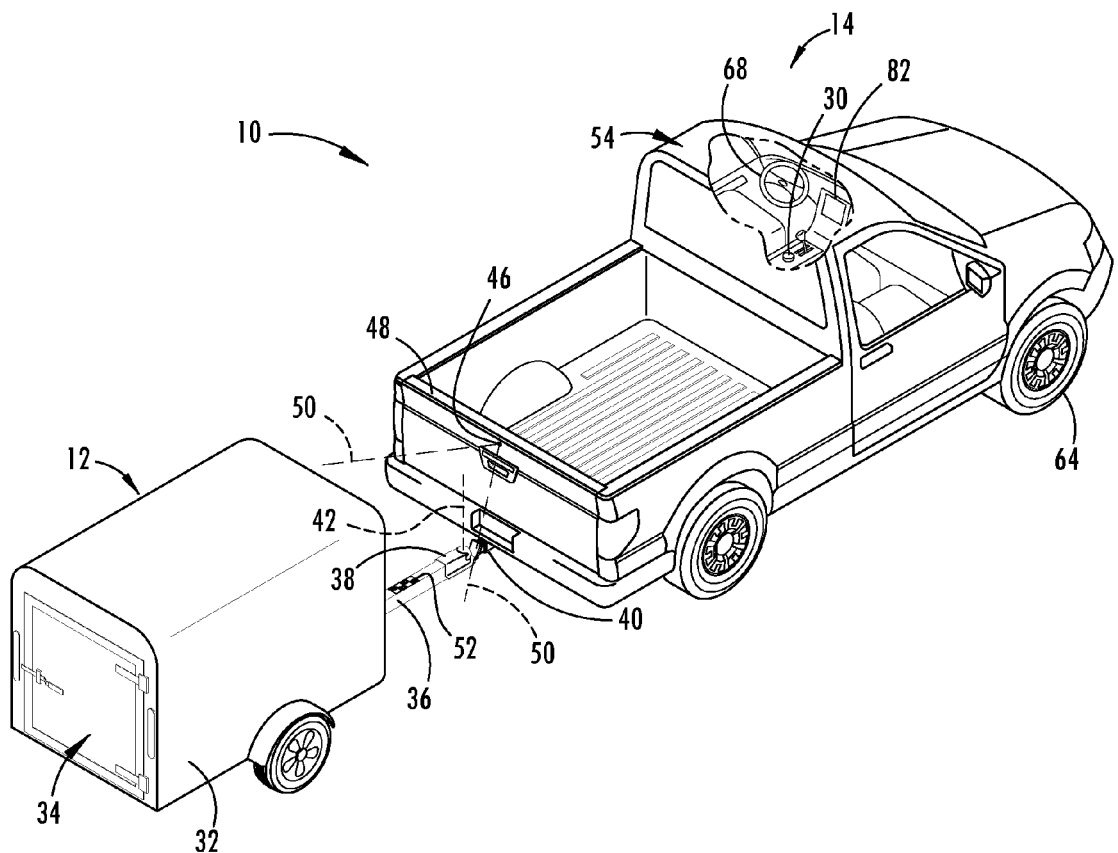
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-14, reference numeral 10 generally designates a trailer backup assist system 10 for controlling a backing path of a trailer 12 attached to a vehicle 14 by allowing a driver of the vehicle 14 to specify a desired reference path 26 of the trailer 12. In one embodiment, the trailer backup assist system 10 automatically steers the vehicle 14 to guide the trailer 12 on the desired reference path 26 as a driver uses the accelerator and brake pedals to control the reversing speed of the vehicle 14. To monitor the position of the trailer 12 relative to the vehicle 14, the trailer backup assist system 10 may include a sensor system 16 that senses a hitch angle $\gamma$ between the trailer 12 and the vehicle 14. Further, the trailer backup assist system 10 may also include a steering input device 18, such as a mode selection device 20, for a driver to provide the desired path of the trailer 12. In one embodiment, the mode selection device 20 may be used with the vehicle 14 and the trailer 12 in a static orientation for selecting a longitudinal direction 22 of the trailer 12, a longitudinal direction 24 of the vehicle 14, or a curvature based on the hitch angle $\gamma$ in the static orientation, thereby defining a reference path 26 for backing the trailer 12. A curvature controller 28 of the trailer backup assist system 10 may generate a steering command to the vehicle 14 based on the sensed hitch angle $\gamma$ and a kinematic relationship between the trailer 12 and the vehicle 14 to guide the trailer 12 on the reference path 26. It is contemplated that additional embodiments of the trailer back assist system may also include an additional or alternative steering input device 18, such as a rotatable knob 30, which may be actuated as the vehicle 14 and trailer 12 reverse to adjust a desired curvature of the trailer 12. It is also conceivable that additional steering input devices 18 may supplement or override the mode selection device 20, which would allow the driver to temporarily or permanently alter the reference path 26 of the trailer 12, for example by adjusting the curvature of the reference path 26, as disclosed in more detail herein.

With reference to the embodiment shown in FIG. 1, the vehicle 14 is a pickup truck that is configured with one embodiment of the trailer backup assist system 10 for controlling the backing path of the trailer 12 that is attached to the vehicle 14. Similarly, the vehicle 14 is pivotally attached to one embodiment of the trailer 12 that has a box frame 32 with an enclosed cargo area 34 and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle $\gamma$. It should be appreciated that additional embodiments of the trailer 12 may have various shapes and sizes configured for different loads and items, may include more than one axle, and may alternatively couple with the vehicle 14 to provide a pivoting connection, such as by connecting with a fifth wheel connector.

Still referring to FIG. 1, the sensor system 16 in the illustrated embodiment includes a vision based hitch angle sensor 44 for sensing the hitch angle $\gamma$ between the vehicle 14 and the trailer 12. More specifically, a camera 46 (e.g. video imaging camera) is shown located proximate an upper region of the vehicle tailgate 48 at the rear of the vehicle 14, such that the camera 46 is elevated relative to the tongue 36 of the trailer 12. The camera 46, as illustrated, has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle $\gamma$, in the illustrated embodiment, the trailer backup assist system 10 may utilize a target 52 placed on the trailer 12 to allow the trailer backup assist system 10 to employ information acquired via image acquisition and processing of the target 52. For instance, the illustrated camera 46 may include a video imaging camera that repeatedly captures successive images of the trailer 12 for processing to identify the target 52 and its location on the trailer 12 and relative movement for determining the hitch angle $\gamma$. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that the hitch angle sensor 44 and the sensor system 16 for providing the hitch angle $\gamma$, according to additional embodiments, may include one or various combinations of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, a yaw rate sensor on the trailer 12 and the vehicle 14, energy transducers of a reverse aid system, a blind spot system, and/or a cross traffic alert system, and other conceivable sensors or indicators of the hitch angle $\gamma$ to supplement or be used in place of the vision based hitch angle sensor 44.

Figure 2:
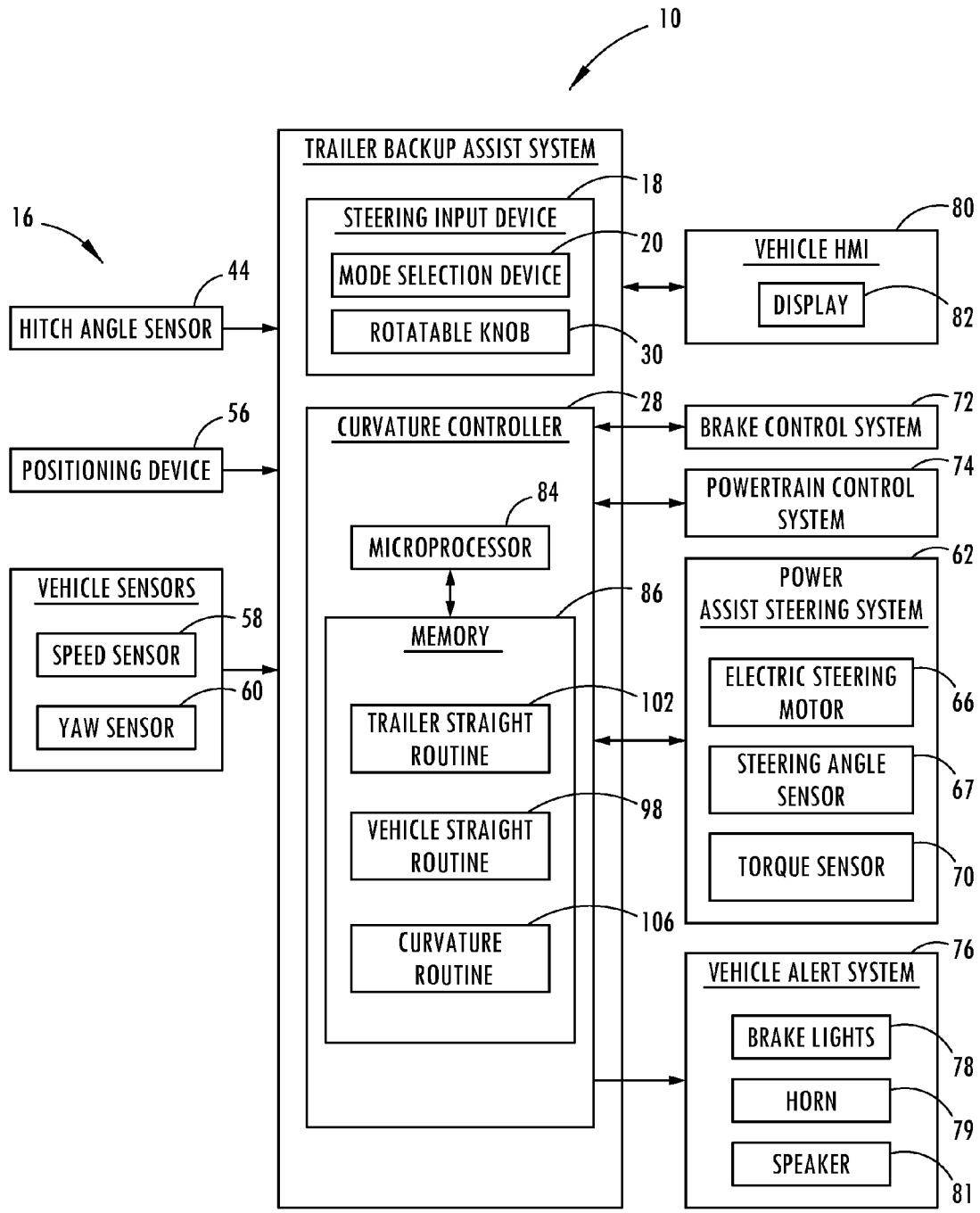
FIG. 2 is a block diagram illustrating one embodiment of the trailer backup assist system having a steering input device and a curvature controller.

With reference to the embodiment of the trailer backup assist system 10 shown in FIG. 2, the hitch angle sensor 44 provides the sensed hitch angle $\gamma$ to the trailer backup assist system 10. Similarly, the illustrated embodiment of the trailer backup assist system 10 receives vehicle status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and vehicle 14 and based on the hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw sensor 60. It is contemplated that in additional embodiments the hitch angle sensor 44 and other vehicle sensors and devices may provide sensor signals or other information, such as proximity sensor signals or successive images of the trailer 12, that a controller of the trailer backup assist system 10 may process with various routines to determine a value or an indicator, such as a hitch angle value or a range of hitch angles γ.

As also shown in FIG. 2, one embodiment of the trailer backup assist system 10 is in communication with a power assist steering system 62 of the vehicle 14 to operate steered wheels 64 (FIG. 1) of the vehicle 14 for moving the vehicle 14 in such a manner that the trailer 12 reacts in accordance with the desired curvature of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle is sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the curvature controller 28 of the trailer backup assist system 10 with information relating to a rotational position of steered wheels 64 of the vehicle 14, including a steering angle. The curvature controller 28 in the illustrated embodiment processes the current steering angle, in addition to other vehicle 14 and trailer 12 conditions to guide the trailer 12 along the desired reference path 26 and/or desired curvature. It is conceivable that the trailer backup assist system 10, in additional embodiments, may be an integrated component of the power assist steering system 62. For example, the power assist steering system 62 can include a trailer backup assist algorithm for generating vehicle steering information and commands as a function of all or a portion of information received from the steering input device 18, the hitch angle sensor 44, the power assist steering system 62, a brake control system 72, a powertrain control system 74, and other vehicle sensors and devices.

As illustrated in FIG. 2, the brake control system 72 may also communicate with the curvature controller 28 to provide the trailer backup assist system 10 with braking information, such as wheel speed, and to receive braking commands from the curvature controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the yaw sensor 60, for use in determining the vehicle steering commands. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With additional reference to FIG. 2, the trailer backup assist system 10 in the illustrated embodiment may communicate with one or more devices including a vehicle alert system 76, which may include vehicle brake lights 78 and vehicle emergency flashers for providing a visual alert and a vehicle horn 79 and/or speaker 81 for providing an audible alert. Additionally, the trailer backup assist system 10 may communicate with a human machine interface (HMI) 80 for the vehicle 14 including a vehicle display 82, such as a center stack mounted navigation/entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. The portable device may display one or more images of the trailer 12 and the target location within a desired target placement zone on display. In addition, the portable device may provide feedback information about the vehicle target connection including visual and audible alerts.

As further illustrated in FIG. 2, the trailer backup assist system 10 includes a steering input device 18 that is connected to the curvature controller 28 for allowing communication of information therebetween. It is disclosed herein that the steering input device 18 can be coupled to the curvature controller 28 in a wired or wireless manner. The steering input device 18 provides the trailer backup assist system 10 with information defining the commanded reference path 26 of travel of the trailer 12 for the curvature controller 28 to process and generate steering commands (i.e., trailer steering information). The trailer steering information can include information relating to a commanded change in the path of travel, such as a change in radius of the reference path 26 (e.g., the curvature) and information relating to an indication that the trailer 12 is to travel along a path defined by a longitudinal centerline axis of the trailer 12 (i.e., along a substantially straight path of travel). As will be discussed below in detail, the steering input device 18 according to the illustrated embodiment may include the mode selection device 20 for selecting the longitudinal direction 22 of the trailer 12, the longitudinal direction 24 of the vehicle 14, or the curvature based on the present hitch angle γ or intervention from another steering input device 18, such as the rotatable knob 30. Accordingly, the steering input device 18 in the illustrated embodiment also includes a rotational control input device for allowing a driver of the vehicle 14 to command desired trailer steering actions. For instance, the rotational control input device may be the rotatable knob 30, which can be rotatable about a rotational axis extending through a top surface or face of the knob. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a commanded curvature for reference path 26, such as a joystick, input provided from a portable device, a vision based system for receiving hand or other gestures, a trajectory planner or other programmable route system, and other conceivable input devices as generally understood by one having ordinary skill in the art.

Still referring to the embodiment shown in FIG. 2, the curvature controller 28 is configured with a microprocessor 84 to process logic and routines stored in memory 86 that receive information from the steering input device 18, the hitch angle sensor 44, the power assist steering system 62, the brake control system 72, the powertrain control system 74, and other vehicle sensors and devices. The curvature controller 28 may generate vehicle steering information and commands as a function of all or a portion of the information received from the steering input device 18, the hitch angle sensor 44, the power assist steering system 62, the brake control system 72, the powertrain control system 74, and other vehicle sensors and devices. Thereafter, the vehicle steering information and commands may be provided to the power assist steering system 62 for affecting steering of the vehicle 14 to achieve a commanded path of travel for the trailer 12. The curvature controller 28 may include the microprocessor 84 and/or other analog and/or digital circuitry for processing one or more routines. Also, the curvature controller 28 may include the memory 86 for storing one or more routines, including a trailer straight routine 102, a vehicle straight routine 98, and a curvature routine 106. It should be appreciated that the curvature controller 28 may be a stand-alone dedicated controller or may be a shared controller integrated with other control functions, such as integrated with the sensor system 16, the power assist steering system 62, and other conceivable onboard or off-board vehicle control systems.

Figure 3:
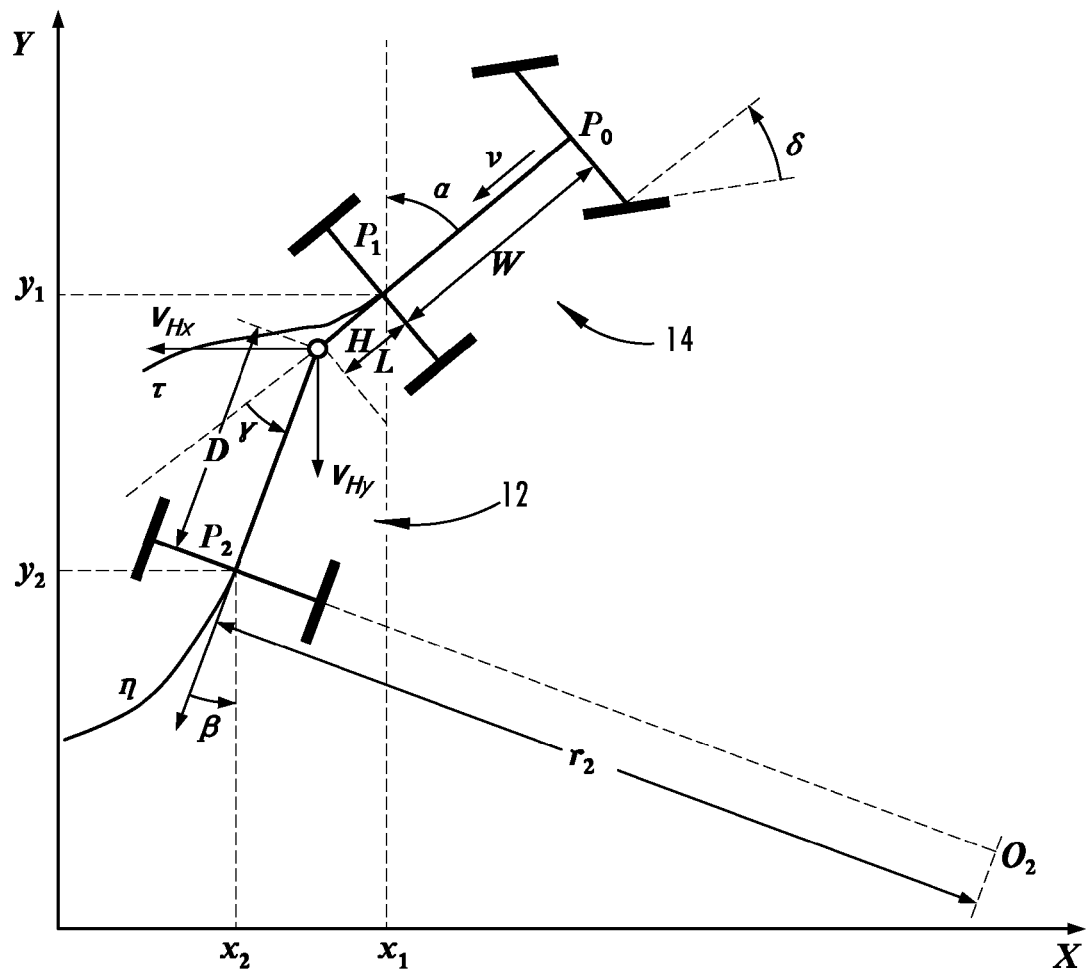
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle towing the trailer 12, a low order kinematic model can be desirable for a trailer backup assist system 10 configured in accordance with some embodiments. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle 14;
α: yaw angle of the vehicle 14;
β: yaw angle of the trailer 12;
γ: hitch angle (γ=β−α);
W: wheel base of the vehicle 14;
L: length between hitch point and rear axle of the vehicle 14;
D: distance between hitch point and axle of the trailer 12 or effective axle for a multiple axle trailer 12 (axle length may be an equivalent); and
$r_2$: curvature radius for the trailer 12.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where) $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ is determined from the driver input via the steering input device 18. Through the use of the equation for providing steering angle, a corresponding steering command can be generated for controlling the power assist steering system 62 of the vehicle 14.

In an additional embodiment of the curvature controller 28, an assumption may be made that a longitudinal distance L between the pivoting connection and the rear axle of the vehicle 14 is equal to zero for purposes of operating the trailer backup assist system 10 when a gooseneck trailer 12 or other similar trailer 12 is connected with the a hitch ball or a fifth wheel connector located over a rear axle of the vehicle 14. The assumption essentially assumes that the pivoting connection with the trailer 12 is substantially aligned with the rear axle. When such an assumption is made, the curvature controller 28 may generate the steering angle command for the vehicle 14 as a function independent of the distance L between the pivoting connection and the rear axle of the vehicle 14. It is appreciated that the gooseneck trailer 12 mentioned generally refers to the tongue 36 configuration being elevated to attach with the vehicle 14 at an elevated location over the rear axle, such as within a bed of a truck, whereby embodiments of the gooseneck trailer 12 may include flatbed cargo areas, enclosed cargo areas, campers, cattle trailers, horse trailers, lowboy trailers, and other conceivable trailers with such a tongue configuration.

Figure 4:
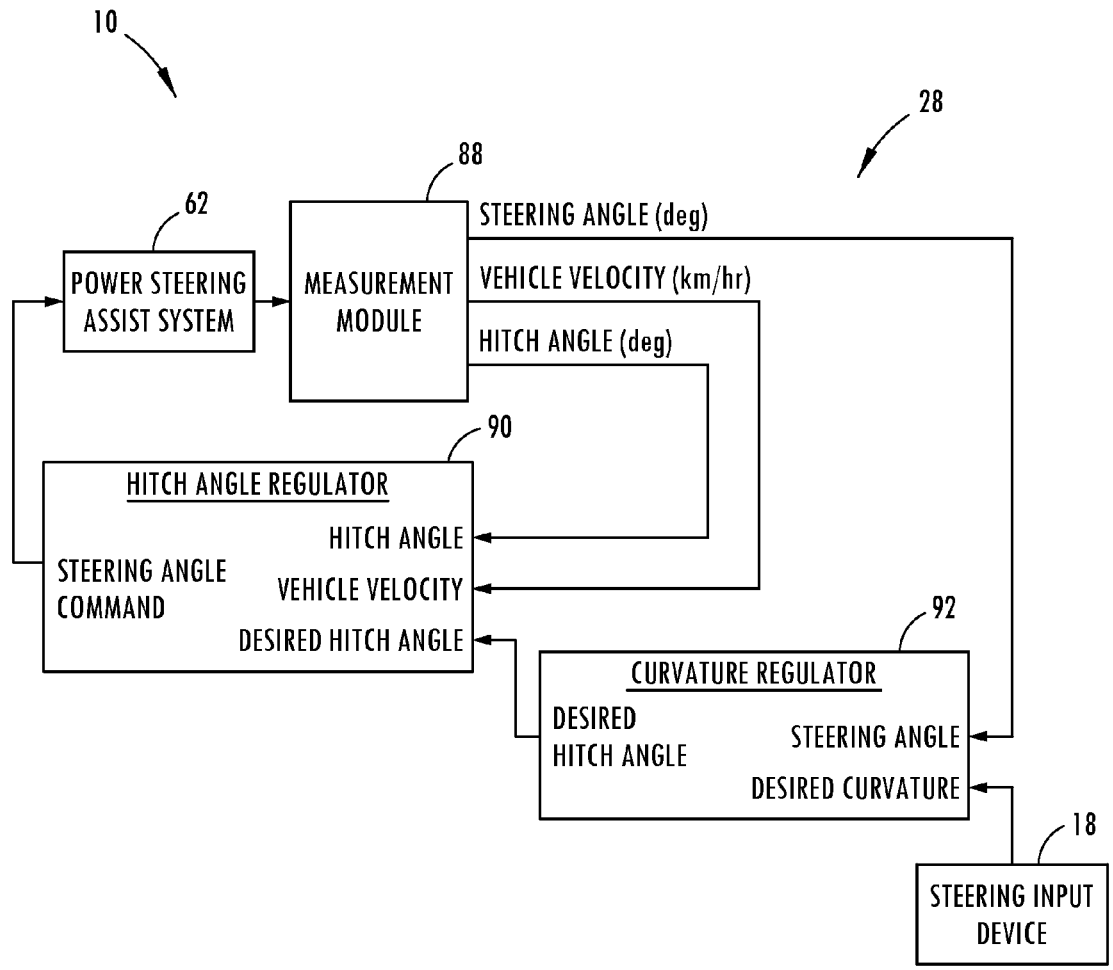
FIG. 4 is a schematic block diagram illustrating portions of a curvature controller, according to an additional embodiment, and other components of the trailer backup assist system, according to such an embodiment.

Yet another embodiment of the curvature controller 28 of the trailer backup assist system 10 is illustrated in FIG. 4, showing the general architectural layout whereby a measurement module 88, a hitch angle regulator 90, and a curvature regulator 92 are routines stored in the memory 86 of the curvature controller 28. In the illustrated layout, the steering input device 18 provides a desired curvature $\kappa_2$ value to the curvature regulator 92 of the curvature controller 28. The curvature regulator 92 computes a desired hitch angle $\gamma(d)$ based on the current desired curvature $\kappa_2$ along with the steering angle $\delta$ provided by a measurement module 88 in this embodiment of the curvature controller 28. The measurement module 88 may be a memory device separate from or integrated with the curvature controller 28 that stores data from sensors of the trailer backup assist system 10, such as the hitch angle sensor 44, the vehicle speed sensor 58, the steering angle sensor 67, or alternatively the measurement module 88 may otherwise directly transmit data from the sensors without functioning as a memory device. Once the desired hitch angle $\gamma(d)$ is computed by the curvature regulator 92 the hitch angle regulator 90 generates a steering angle command based on the computed desired hitch angle $\gamma(d)$ as well as a measured hitch angle $\gamma(m)$ and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ without substantial overshoot or continuous oscillation of the path of travel about the desired curvature $\kappa_2$.

Figure 5:
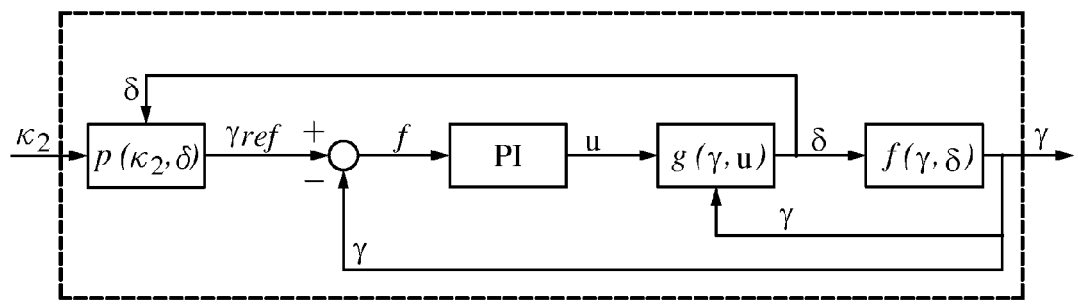
FIG. 5 is schematic block diagram of the curvature controller of FIG. 4, showing the feedback architecture and signal flow of the curvature controller, according to such an embodiment.

As also shown in FIG. 5, the embodiment of the curvature controller 28 shown in FIG. 4 is illustrated in a control system block diagram. Specifically, entering the control system is an input, $\kappa_2$, which represents the desired curvature of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where,
$\kappa_2$ represents the desired curvature of the trailer 12 or $1/r_2$ as shown in FIG. 3;
$\delta$ represents the steering angle;
L represents the distance from the rear axle of the vehicle 14 to the hitch pivot point;
D represents the distance from the hitch pivot point to the axle of the trailer 12; and
W represents the distance from the rear axle to the front axle of the vehicle 14.

With further reference to FIG. 5, the output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

As also shown in FIG. 5, the feedback control law, $g(u, \gamma, v)$, is implemented with a proportional integral (PI) controller, whereby the integral portion substantially eliminates steady-state tracking error. More specifically, the control system illustrated in FIG. 58 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_p(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller or otherwise determined by the trailer backup assist system 10, as disclosed in greater detail herein.

Figure 9:
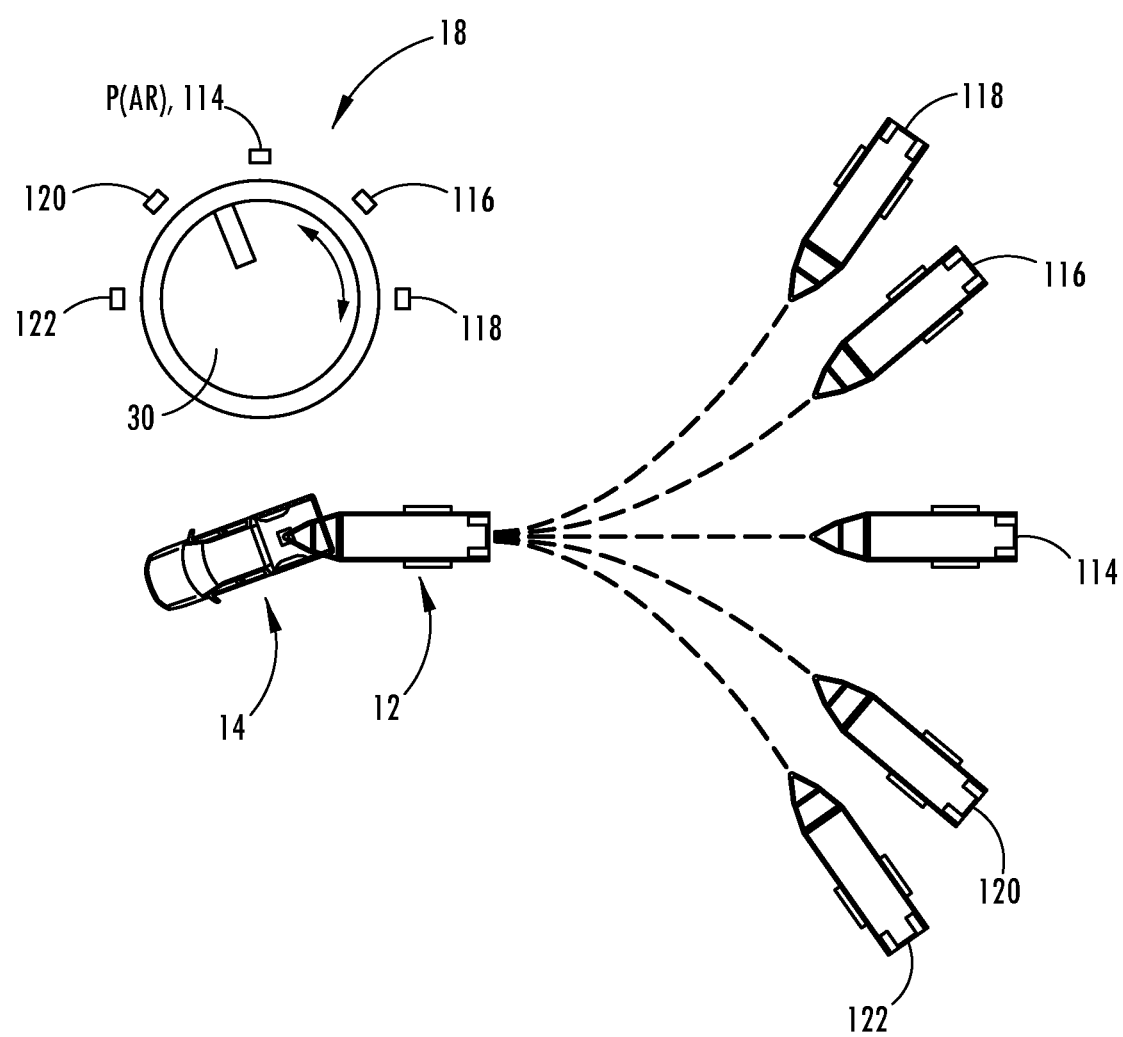
FIG. 9 is a plan view of one embodiment of a rotatable knob for selecting a desired curvature of a trailer and a corresponding schematic diagram illustrating a vehicle and a trailer with various trailer curvature paths correlating with desired curvatures that may be selected.

FIG. 9 shows an example of a trailer path curvature function plot for a steering input device 18 with a degree of rotation of the rotatable knob 30, for example, correlating with the resulting trailer path curvature (e.g., trailer path curvature $\kappa_2$). In this example, a curve specifying trailer path curvature relative to user input (e.g., amount of rotation) at a rotary input device (e.g., a knob) is defined by a cubic function. However, a skilled person will appreciate that embodiments of the disclosed subject matter are not limited to any particular function between a magnitude and/or rate of input at a trailer backup steering input apparatus (e.g., knob rotation) and a resulting trailer path curvature value. The curvature of the trailer 12 as commanded by the steering input device 18 and the trailer backup assist system 10 is described in greater detail below.

Figure 6:
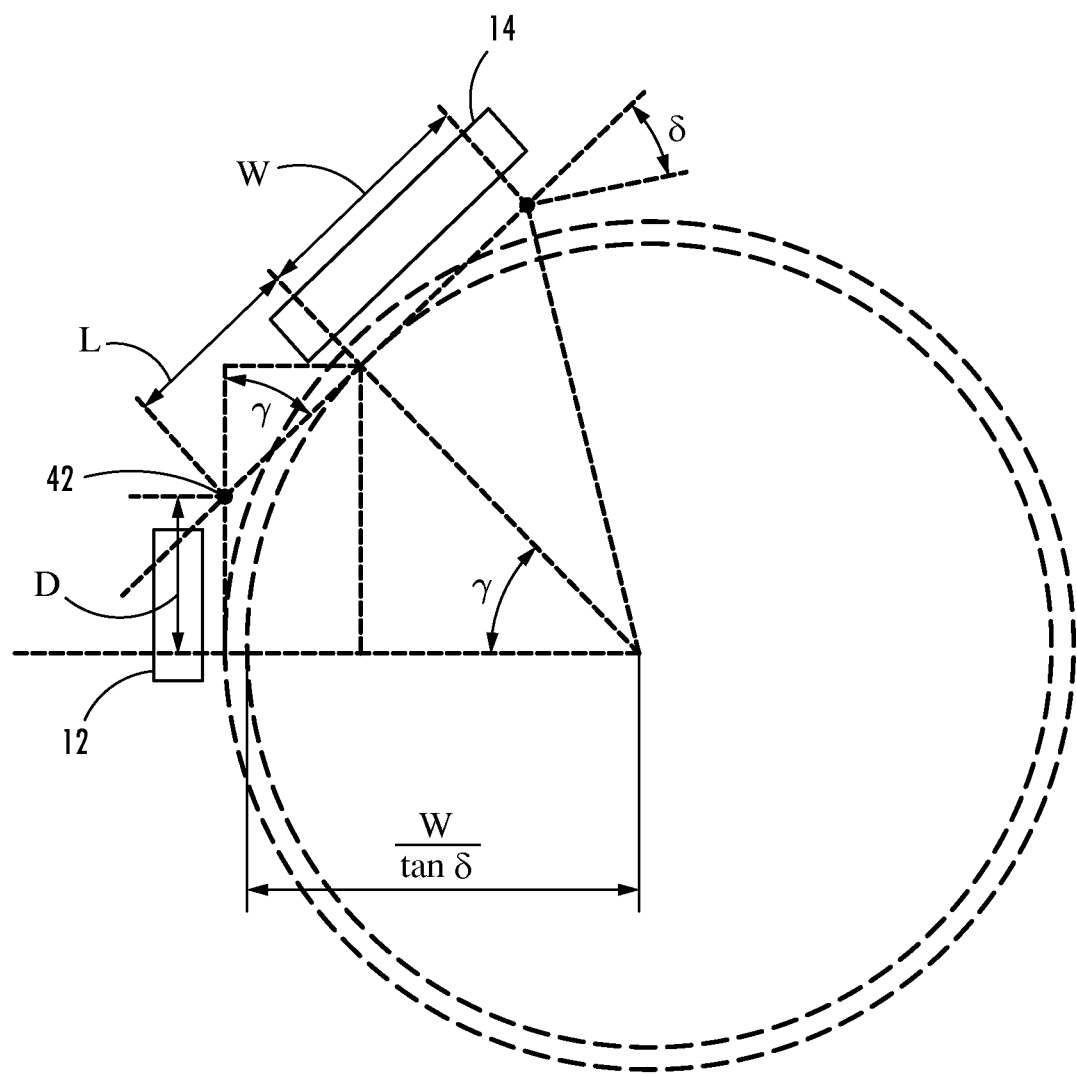
FIG. 6 is a schematic diagram showing a relationship between a hitch angle and a steering angle of the vehicle as it relates to curvature of the trailer and a jackknife angle.

Referring now to FIG. 6, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle γ(j) refers to a hitch angle γ that while backing cannot be overcome by the maximum steering input for a vehicle such as, for example, the steered front wheels of the vehicle 14 being moved to a maximum steered angle δ at a maximum rate of steering angle change. The jackknife angle γ(j) is a function of a maximum wheel angle for the steered wheel of the vehicle 14, the wheel base W of the vehicle 14, the distance L between hitch point and the rear axle of the vehicle 14, and the length D between the hitch point and the axle of the trailer 12 or the effective axle when the trailer 12 has multiple axles. When the hitch angle γ for the vehicle 14 and the trailer 12 achieves or exceeds the jackknife angle γ(j), the vehicle 14 may be pulled forward to reduce the hitch angle γ. Thus, for limiting the potential for a vehicle/trailer system attaining a jackknife angle, it is preferable to control the yaw angle of the trailer 12 while keeping the hitch angle γ of the vehicle/trailer system relatively small.

A kinematic model representation of the vehicle 14 and the trailer 12 can be used to determine a jackknife angle for the vehicle-trailer combination. Accordingly, with reference to FIGS. 3 and 6, a steering angle limit for the steered front wheels requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle δ(max). The steering angle for circular motion with hitch angle γ is defined by the following equation.

$$\tan\delta_{max} = \frac{w \sin \gamma_{max}}{D + L\cos \gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos\bar{\gamma} = \frac{-b \pm \sqrt{b^2 - 4ac}}{2a}$$

where,
$a = L^2 \tan^2 \delta(max) + W^2$;
$b = 2 LD \tan^2 \delta(max)$; and
$c = D^2 \tan^2 \delta(max) - W^2$.

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer path curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the curvature controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing a hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored such as, for example, by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still other embodiment, a predefined countermeasure or predefined set of countermeasures may be the applicable countermeasure(s).

The objective of a countermeasure in the context of the disclosed subject matter (i.e., a jackknife reduction countermeasure) is to alleviate a jackknife enabling condition. To this end, such a countermeasure can be configured to alleviate the jackknife enabling condition using a variety of different strategies. In a vehicle speed sensitive countermeasure strategy, actions taken for alleviating the jackknife enabling condition can include overriding and/or limiting driver requested changes to the radius of curvature of the trailer 12 (e.g., being requested via a steering input apparatus configured in accordance with the disclosed subject matter) as a function of vehicle speed (e.g., via a lookup table correlating radius of curvature limits to vehicle speed). In a countermeasure strategy where trailer curvature requests are limited as a function of speed and driver curvature command transient rates, actions taken for alleviating the jackknife enabling condition can include rate limiting trailer curvature command transients as requested by a driver above a predefined vehicle speed whereas, under the predefined vehicle speed, the as-requested trailer curvature are not rate limited. In a torque limiting countermeasure strategy, actions taken for alleviating the jackknife enabling condition can include application of full available powertrain torque being inhibited when the jackknife enabling condition is present while the vehicle 14 is above a predefined speed and application of full available powertrain torque being allowed when the vehicle speed is reduced below the predefined speed while in the torque inhibiting mode. As opposed to a fixed predefined speed, the torque limiting countermeasure strategy can utilize a speed threshold that is a function of hitch angle γ (i.e., speed threshold inversely proportional to hitch angle acuteness). In a driver accelerator pedal transient detection countermeasure strategy, actions taken for alleviating the jackknife enabling condition can include overriding and/or limiting driver requested trailer radius of curvature as a function of transient accelerator pedal requests (e.g., requested trailer radius of curvature limited when a large accelerator pedal transient is detected). In a hitch angle rate sensitive countermeasure strategy, actions taken for alleviating the jackknife enabling condition can include using hitch angle rate in a predefined or calculated mapping with current hitch angle position to limit driver requested trailer radius of curvature. Accordingly, in view of the disclosures made herein, a skilled person will appreciate that embodiments of the disclosed subject matter are not unnecessarily limited to a countermeasure strategy of any particular configuration.

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for commanding a curvature of a reference path 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in curvature of a path of a trailer 12 during such trailer backup assist.

Figure 7:
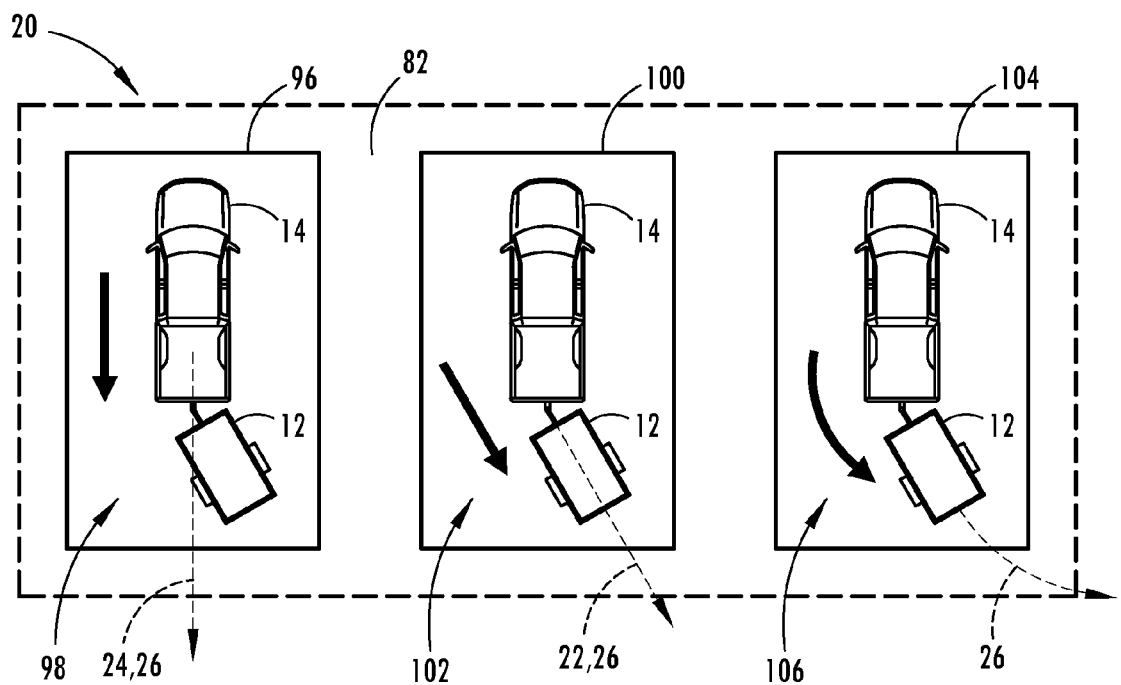
FIG. 7 is a plan view of a mode selection device having a series of buttons for selecting a control mode for operating the trailer backup assist system, according to one embodiment.

Referring now to FIG. 7, one embodiment of the steering input device 18 includes a mode selection device 20. The mode selection device 20 in the illustrated embodiment shown in FIG. 7 includes three discrete buttons provided on a display 82 of the vehicle HMI 80. Specifically, the center stack display 82 of the vehicle 14 as shown in FIG. 1 may include capacitive touch screen functionality for the driver to select one of the three buttons by manually touching one of the buttons on the display 82. It is also contemplated that the buttons may be provided on an alternative display, such as above the steering wheel 68, a heads up display, a display on a portable device, or other conceivable electronic displays within or on the vehicle 14, whereby one of the buttons may be alternatively selected such as with operational buttons on the steering wheel 68. It is also contemplated that the buttons of the mode selection device 20 may be physical push-buttons or switches arranged on the center stack, the center console or another interior surface of the vehicle 14.

As also shown in the embodiment of the mode selection device 20 illustrated in FIG. 7, three distinct backing control modes 94 are each provided with one of the three discrete buttons, such that one may be individually selected to provide a command to the curvature controller 28 indicative of a desired reference path 26 for the trailer 12 to follow. In the illustrated embodiment, it is understood that the vehicle 14 and trailer 12 must be in a static orientation relative to each other to select one of the buttons, whereby the static orientation may be defined by the vehicle 14 and the trailer 12 also being substantially stopped relative to the ground surface. However, it is contemplated that alternative embodiments of the mode selection device 20 or alternative backing control modes thereof may be selected during reversing movement of the vehicle 14 and/or trailer 12. A first button 96 allows for the selection of the vehicle 14 in the static orientation to define a reference path 26 oriented in line with a longitudinal direction 24 of the vehicle 14. With the selection of the first button 96, the curvature controller 28 may process a vehicle straight routine 98 as shown in FIG. 2 and disclosed in greater detail herein. In general, the vehicle straight routine 98 generates steering commands for the vehicle 14 to guide the trailer 12 from its orientation in the static orientation at the time the first button 96 is selected to a position with its longitudinal direction 22, or orientation, in line with the longitudinal direction 24, or orientation, of the vehicle 14 in the static orientation. Upon placing the trailer 12 in line with the longitudinal direction 24 of the vehicle 14 in the static orientation, the vehicle 14 will then operate to guide the trailer 12 straight along the longitudinal direction 24 of the vehicle 14 in the static orientation with a desired curvature input of zero. The longitudinal directions 24 of the vehicle 14 and the trailer 12 may be further defined by a longitudinal center line axis, such as the orientation of the tongue 36 of the trailer 12 and the orientation of the vehicle hitch connector protruding from the vehicle 14.

With continued reference to the embodiment of the mode selection device 20 illustrated in FIG. 7, a second button 100 may be selected to command the curvature controller 28 to process the trailer straight routine 102 as illustrated in FIG. 2. The trailer straight routine 102 defines a reference path 26 for the trailer 12 in the static orientation, such that the reference path 26 is defined by a longitudinal direction 22 of the trailer 12 in the static orientation. In general, the trailer straight routine 102 generates steering commands to the power steering system 62 that maneuver the vehicle 14 to substantially maintain the orientation of the trailer 12 with respect to the ground surface and surrounding environment and guide the trailer 12 along the reference path 26. Upon steering the vehicle 14 to an orientation to substantially maintain the movement of the trailer 12 on the reference path 26, the vehicle 14 will then operate to guide the trailer 12 straight along the longitudinal direction 22 of the trailer 12 in the static orientation with a desired curvature input of zero.

A third button 104 of the mode selection device 20, as illustrated in the embodiment shown in FIG. 7, may be selected to command the curvature controller 28 to process the curvature routine 106. According to one embodiment, the curvature routine 106 defines a desired curvature based on the hitch angle γ between the vehicle 14 and the trailer 12 in the static orientation. In general, the curvature routine 106, according to one embodiment, locks the desired curvature input, such that the trailer 12 will follow a circular path with a generally consistent radius. Accordingly, if the vehicle 14 and trailer 12 are arranged in the static orientation with a hitch angle γ of zero or substantially zero, the desired curvature input may be zero to reverse the trailer 12. It is contemplated that the mode selection device 20 in additional embodiments may include more or fewer backing control modes and accordingly more or fewer selection buttons.

Figure 8:
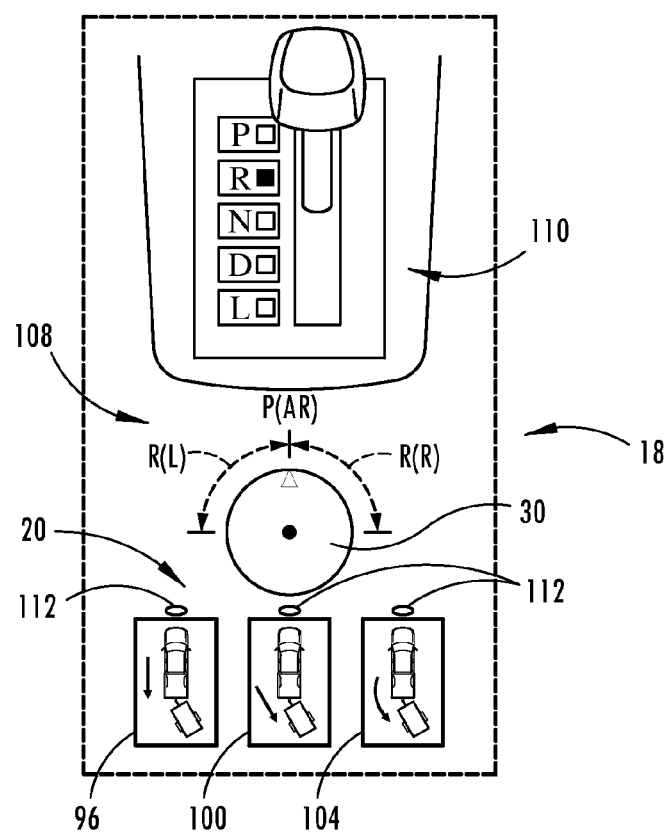
FIG. 8 is a plan view of a steering input device having a rotatable knob and a mode selection device for operating the trailer backup assist system, according to one embodiment.

An additional embodiment of the mode selection device 20 is illustrated in FIG. 8, whereby the three discrete buttons of the mode selection device 20 are disposed on a center console 108 of the vehicle proximate a shifter 110 and a rotatable knob 30. Each of the described buttons are provided with an illumination source, which in the illustrated embodiment is proved as an LED 112 proximate each discrete button. In this embodiment, the rotatable knob 30 may be used to supplement the mode selection device 20 in providing the curvature controller 28 with the desired path of the trailer 12. It is contemplated that the rotatable knob 30, in additional embodiments, may be used to override the mode selection device 20 and independently provide a desired curvature for generating steering commands as described with reference to FIGS. 4 and 5.

The rotatable knob 30, as illustrated in FIGS. 8-9, is biased (e.g., by a spring return) to an at-rest position P(AR) between opposing rotational ranges of motion R(R), R(L). A first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may be used to determine the desired curvature output to the curvature controller 28. As will be discussed below in greater detail, the at-rest position P(AR) of the knob corresponds to a movement sensing device signal indicating that the vehicle 14 should be steered such that the trailer 12 is backed along a substantially straight path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) each correspond to a respective movement sensing device signal indicating a tightest radius of curvature (i.e., most acute trajectory) of a path of travel of the trailer 12 that is possible without the corresponding vehicle steering information causing a jackknife condition. In this regard, the at-rest position P(AR) is a zero curvature commanding position with respect to the opposing rotational ranges of motion R(R), R(L). Accordingly, a ratio of a commanded curvature of a path of a trailer 12 (e.g., radius of a trailer trajectory) and a corresponding amount of rotation of the knob can vary (e.g., non-linearly) over each one of the opposing rotational ranges of motion R(L), R(R) of the knob. It is also disclosed therein that the ratio can be a function of vehicle speed, trailer geometry, vehicle geometry, hitch geometry and/or trailer load.

Figure 10:
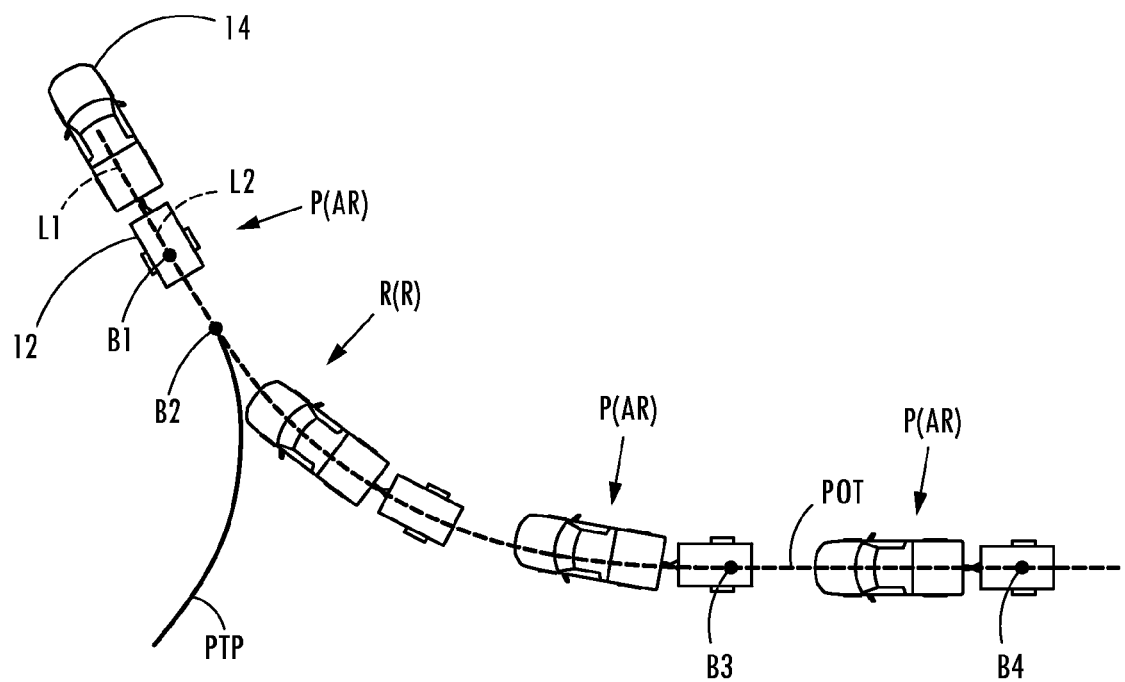
FIG. 10 is a schematic diagram showing a backup sequence of a vehicle and a trailer implementing various curvature selections with the trailer backup assist system, according to one embodiment.

With reference to FIGS. 9-10, as a driver of the vehicle 14 backs the trailer 12, the driver can turn the rotatable knob 30 to modify the reference path 26 commanded by the mode selection device 20 or to indicate a desired curvature of a path of the trailer 12 to follow. According to the embodiment shown in FIG. 9, the steering input device 18 is embodied as a rotatable knob 30 for allowing the driver of the vehicle 14 to command a reference path 26 by indicting a desired curvature. In the illustrated embodiment, the rotatable knob 30 rotates about a central axis between a middle position 114 corresponding to a substantially straight reference path 26 of travel, as defined by the longitudinal direction 22 of the trailer 12, and various rotated positions 116, 118, 120, 122 on opposing sides of the middle position 114, commanding a desired curvature $\kappa_2$ corresponding to a radius of the desired reference path 26 of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing allows a current rotational position of the rotational control input device to be maintained until the rotational control input device is manually moved to a different position. It is also conceivable that the steering input device 18 may include a non-rotational control device that is not rotatable like a knob, but may be configured to selectively provide a desired curvature, a signal causing a trailer 12 to follow a path of travel segment that is substantially straight, and to override or supplement the mode selection device 20. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input path of travel commands, or joystick type input and the like. The rotatable knob 30 or other steering input device 18 may also be configured to provide a tactile feedback signal (e.g., a vibration through the knob) as a warning if any one of a variety of conditions occur. Examples of such conditions include, but are not limited to, the trailer 12 approaching jackknife, the trailer backup assist system 10 has had a failure, the trailer backup assist system 10 has detected a fault, the trailer backup assist system 10 or other system of the vehicle 14 has predicted a collision on the present path of travel of the trailer 12, the trailer backup system has restricted a commanded curvature of a trailer's path of travel (e.g., due to excessive speed or acceleration of the vehicle 14), and the like. Still further, it is conceivable that the steering input device 18 can use illumination and/or an audible signal output (e.g. speaker) to provide certain feedback information or warnings.

Referring again to FIG. 10, an example of using the trailer backup steering input apparatus for dictating a curvature of a path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10 configured in accordance with the disclosed subject matter.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18, such as the mode selection device 20, are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 10, in order to activate the trailer backup assist system 10, the driver interacts with the trailer backup assist system 10 and the trailer backup assist system 10 interacts with the vehicle environment. The trailer backup assist system 10 in this embodiment automatically steers as the driver reverses the vehicle 14. As discussed above, the driver commands the trailer reference path 26 by using a steering input device 18. Further, the curvature controller 28 determines the vehicle steering angle to achieve the reference path 26 and/or the desired curvature, and the driver controls the throttle and brake while the trailer backup assist system 10 controls the steering.

Figure 11:
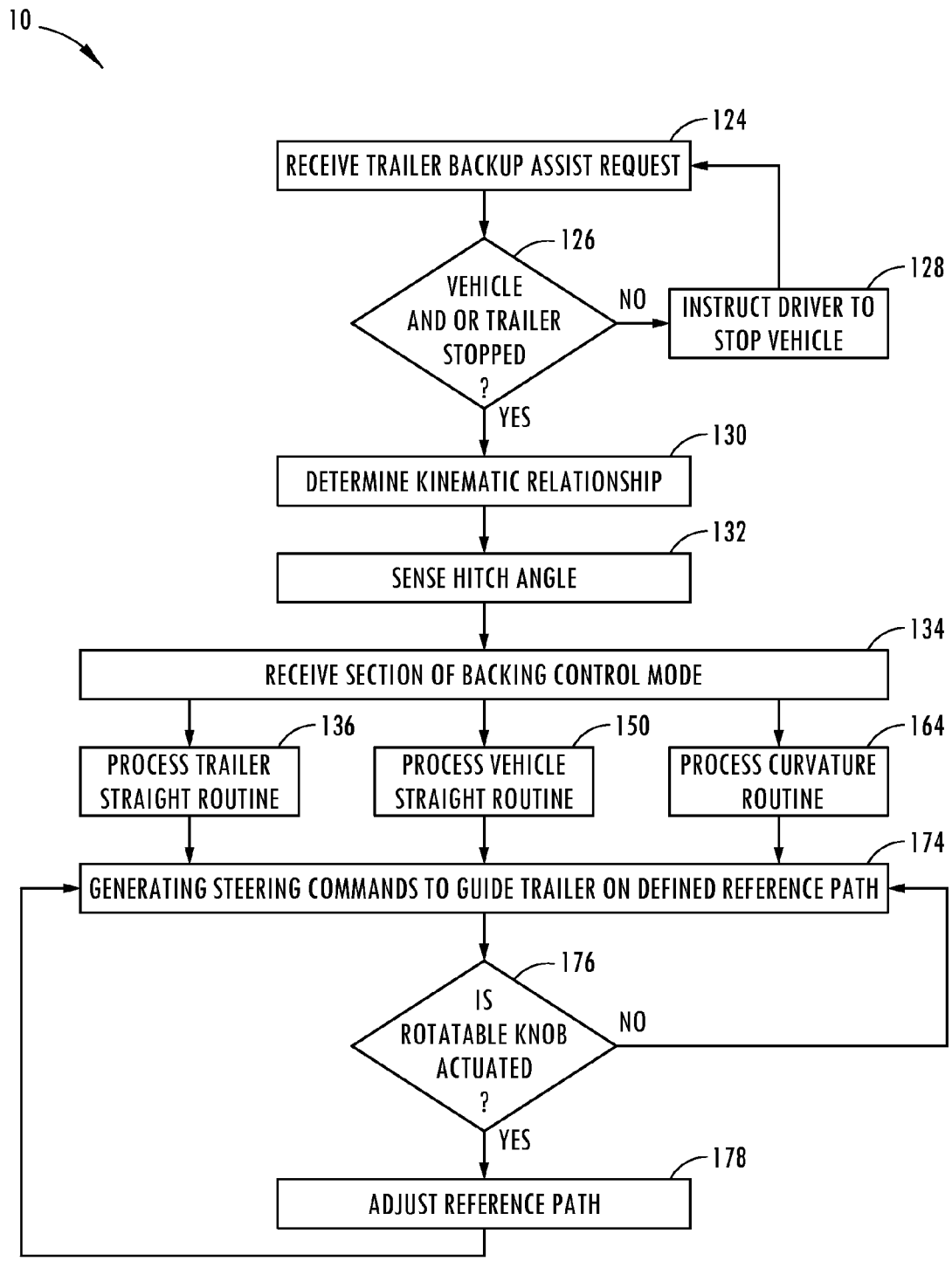
FIG. 11 is a flow diagram illustrating a method of operating a trailer backup assist system, according to one embodiment.

Referring now to FIG. 11, a method is shown for implementing the trailer backup assist system 10 in accordance with one embodiment with the use of the mode selection device 20. Accordingly, trailer steering information is provided through use of the mode selection device 20 and a corresponding routine carried out by the curvature controller 28. Initially, an operation 124 is performed for receiving a trailer backup assist request. Examples of receiving the trailer backup assist request include activating the trailer backup assist system 10 and providing confirmation that the vehicle 14 and trailer 12 are ready to be backed. After receiving a trailer backup assist request, an operation 126 is performed for confirming that the vehicle 14 and trailer 12 are stopped in the static orientation. Examples of information to make such a determination includes, but is not limited to, information from the trailer backup steering input apparatus, information from the speed sensor 58, the hitch angle sensor 44, the positioning device 56, the brake control system 72, the powertrain system, the power assist steering system 62, and other vehicle sensors and devices. If the vehicle 14 and trailer 12 are not stopped in the static orientation, the driver is instructed at step 128 to stop the vehicle 14 before the mode selection device 20 can be operated.

With continued reference to FIG. 11, once it is determined that the vehicle 14 and trailer 12 are stopped, the kinematic relationship between the vehicle 14 and trailer 12 is determined at step 130. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired backing path of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 132 to sense the hitch angle γ between the vehicle 14 and the trailer 12, although this may be done continuously during operation of the trailer backup assist system 10. It is contemplated that in additional embodiments of the trailer backup assist system 10 that the steps of determining the kinematic relationship and sensing the hitch angle γ may occur after a determination is made as to whether the vehicle 14 and trailer 12 are stopped and before a trailer backup assist request is received, or at any other time before steering commands are generated.

Still referring to FIG. 11, after the trailer backup assist system 10 has been calibrated, a request has been received to initiate the trailer backup assist system 10, and it is determined that the vehicle 14 and trailer 12 are stopped, the trailer backup assist system 10 may receive a selection of a backing control mode 94 from the mode selection device 20 at step 134. According to one embodiment of the mode selection device 20, a trailer straight routine 102, a vehicle straight routine 98, or a curvature routine 106 may be selected for processing by the curvature controller 28 (FIG. 2). At step 136 a selection is received for the trailer straight routine 102 and the curvature controller 28 proceeds to process the trailer straight routine 102 in view of the kinematic parameters and the corresponding kinematic relationship.

Figure 12:
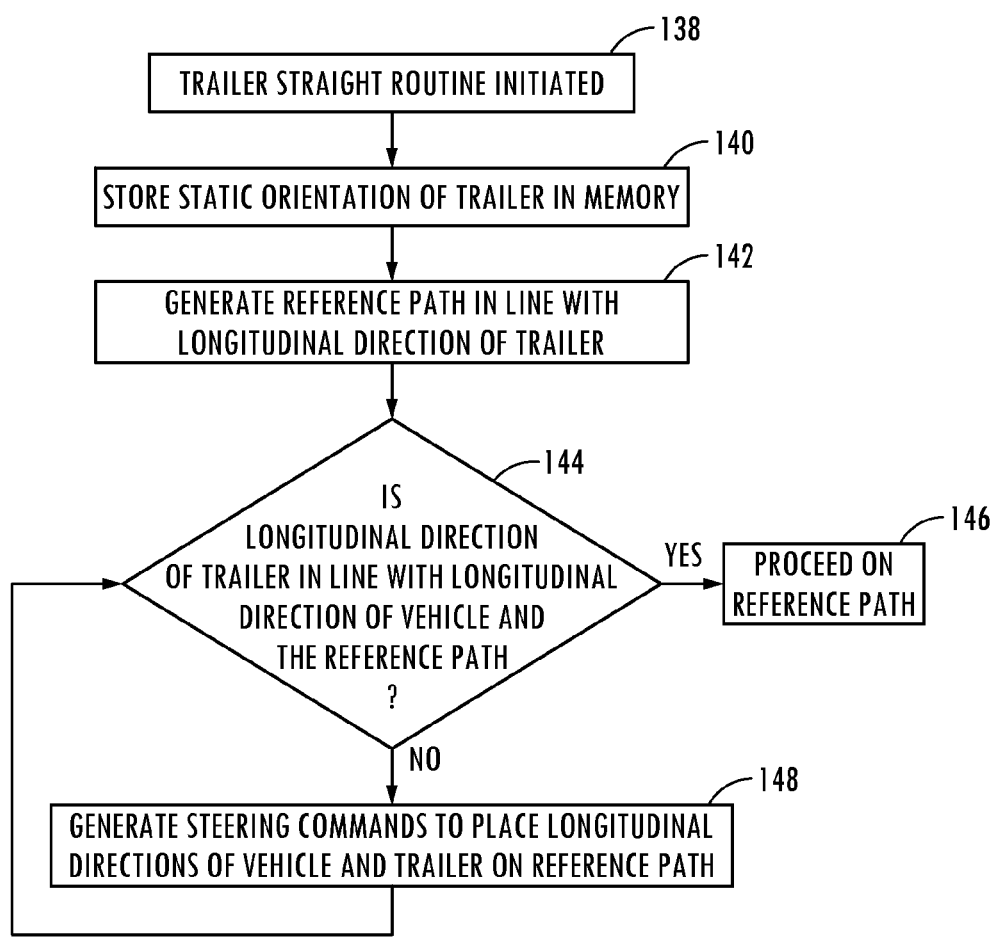
FIG. 12 is a flow diagram illustrating a trailer straight routine of the mode selection device, according to one embodiment.

As shown in FIG. 12, after the trailer straight routine 102 is initiated at step 138, it may proceed to store the static orientation of the trailer 12 in the memory 86 of the curvature controller 28 at step 140. It is contemplated that in additional embodiments, the static orientation of the trailer 12 may not be stored in memory 86, although the reference path 26 generated by the trailer straight routine 102 may additionally or alternatively be stored in memory 86 for continued reference in determining whether the vehicle 14 and the trailer 12 are proceeding along the desired reference path 26. As such, in the illustrated embodiment the reference path 26 is generated at step 142 after the static orientation of the trailer 12 is stored in memory 86. The reference path 26 generated by the trailer straight routine 102 is in line with the longitudinal direction 22 of the trailer 12 in the static orientation. Before generating any steering commands, the trailer backup assist system 10 at step 144 determines whether the longitudinal direction 22 of the trailer 12 is in line with the longitudinal direction 24 of the vehicle 14 and with the reference path 26. If it is determined that the vehicle 14, trailer 12, and reference path 26 are in line a zero curvature input is provided and the trailer backup assist system 10 may proceed on the defined reference path 26 at step 146. However, when the initial hitch angle is not zero, steering commands are generated at step 148 by the trailer backup assist system 10 to place the longitudinal directions of the vehicle 14 and the trailer 12 on the reference path 26. It is contemplated that the steering commands may be generated with a trajectory planner or another conceivable guidance system. One example of a trajectory planner is further described in U.S. patent application Ser. No. 14/257,384, now U.S. Pat. No. 9,238,483, which is incorporated herein by reference in its entirety. The steering commands from such a guidance system may only be necessary to bring the longitudinal directions 24 of the vehicle 14 and the trailer 12 in line with the reference path 26, whereby the trailer backup assist system 10 can proceed with guiding the trailer 12 on the reference path 26 defined by the trailer straight routine 102 using a zero curvature input.

Figure 13:
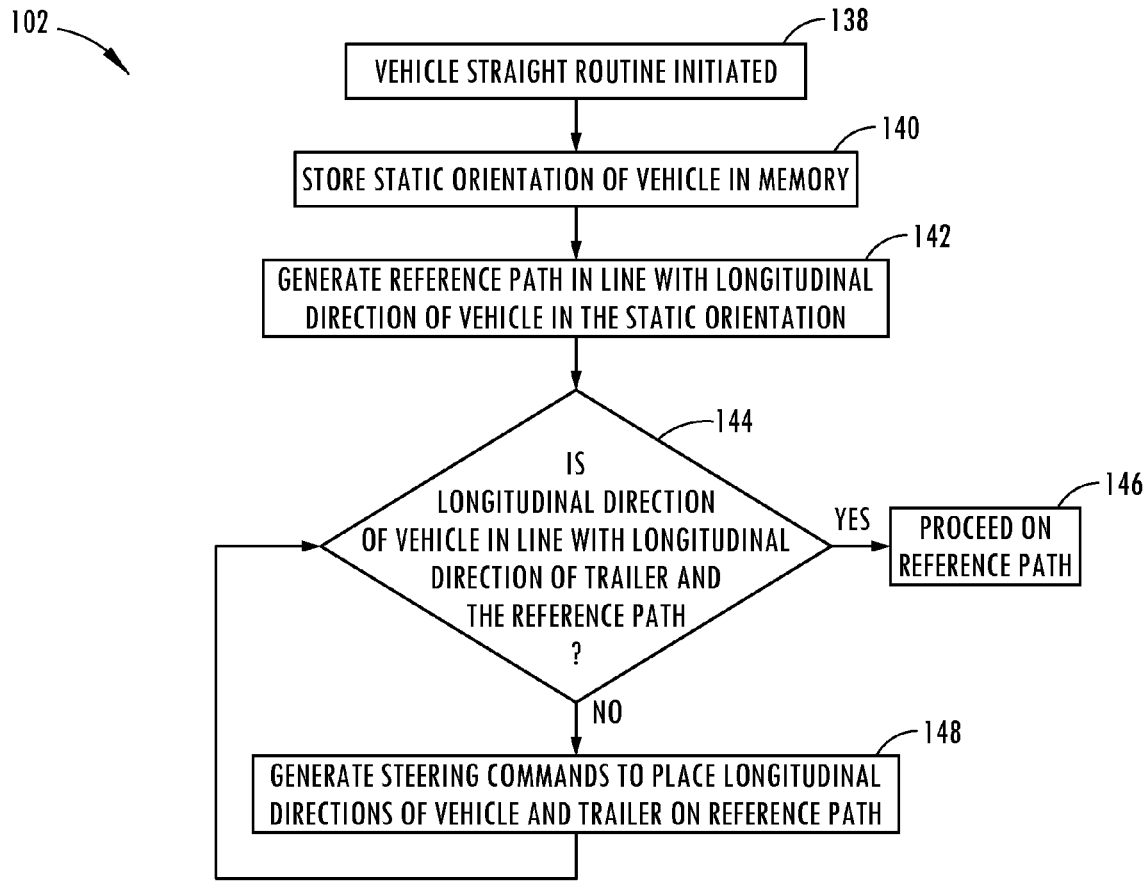
FIG. 13 is a flow diagram illustrating a vehicle straight routine of the mode selection device, according to one embodiment.

Similarly, if the mode selection device 20 is selected at step 150 to perform the vehicle straight routine 98, the vehicle straight routine 98 is initiated at step 152 according to the embodiment illustrated in FIG. 13. In the illustrated embodiment, the static orientation of the vehicle 14 is initially stored in memory 86 at step 154 for continued reference when guiding the trailer 12 on the corresponding reference path 26. At step 156, the vehicle straight routine 98 proceeds to generate a reference path 26 in line with the longitudinal direction 24 of the vehicle 14 and the static orientation. Again, before proceeding to generate steering commands, the vehicle straight routine 98 determines at step 158 whether the longitudinal direction 24 of the vehicle 14 is in line with the longitudinal direction 22 of the trailer 12 and the reference path 26. If the longitudinal direction 24 of the vehicle 14 and the trailer 12 are in line with the reference path 26, the trailer backup assist system 10 can proceed to guide the trailer 12 on the reference path 26 at step 160. However, the vehicle straight routine 98 may generate steering commands at step 162 to place the longitudinal directions 24 of the vehicle 14 and the trailer 12 on the reference path 26 if such condition is not present. Again, a trajectory planner or other guidance system may be used to generate such steering commands and a zero curvature input may be provided once the longitudinal directions of the vehicle and trailer are in line with the reference path 26.

Figure 14:
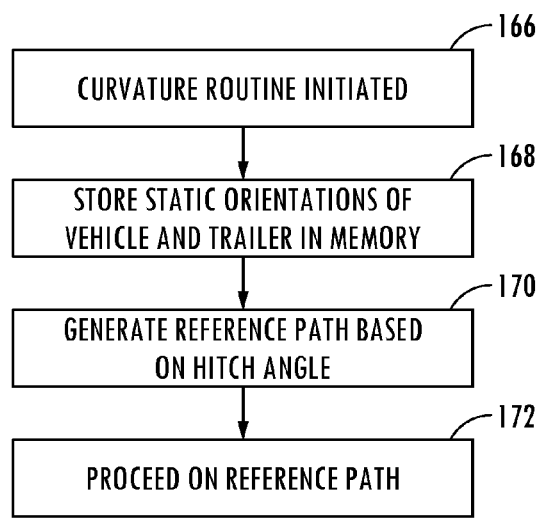
FIG. 14 is a flow diagram illustrating a curvature routine of a mode selection device, according to one embodiment.

With continued reference to FIG. 11, if the mode selection device 20 is selected at step 164 with a command to initiate the curvature routine 106, according to the embodiment illustrated in FIG. 14, the curvature routine 106 upon initiation at step 166 stores the static orientation of the vehicle 14 and the trailer 12 in memory 86 at step 168. Based on the resulting hitch angle $\gamma$ from the static orientation of the vehicle 14 and the trailer 12, a reference path 26 is generated at step 170 for guidance of the trailer 12 in accordance with the curvature routine 106. As previously described, the curvature controller 28 of the trailer backup assist system 10 may generate steering commands based on a desired curvature. Therefore, the reference path 26 generated by the curvature routine 106 may equate to a desired curvature input for operation of the trailer backup assist system 10. Accordingly, upon generating the reference path 26, the curvature routine 106 at step 172 proceeds to allow the curvature controller 28 to guide the trailer 12 on the reference path 26.

Still referring to FIG. 11, once the mode selection device 20 has generated a reference path and generated any necessary steering commands, the curvature controller 28 may continue to generate steering commands at step 174 to guide the trailer 12 on the reference path. If the trailer backup assist system 10 determines that the rotatable knob 30 is actuated at step 176 to change the curvature of the trailer's backing path, the reference path 26 generated by the mode selection device 20 may be altered or otherwise adjusted at step 178. With the adjusted reference path 26, additional steering commands may be generated to continue to guide the trailer 12 on the reference path 26. However, it is contemplated that in additional embodiments the rotatable knob 30 or any other additional steering input devices 18 may not be included to alter the reference path 26. Also, it is contemplated that the rotatable knob 30 or other steering input devices 18 may override the reference path 26, thereby removing any selection made to the mode selection device 20. Once it is determined that the trailer backup assist system 10 is complete and the vehicle 14 has guided the trailer 12 to a desired destination point, processing done by the curvature controller 28 may stop, otherwise the method will continually be performing the operation for receiving a trailer backup assist request, determining the vehicle steering information, determining the kinematic relationship, sensing the hitch angle $\gamma$, generating vehicle steering commands, and other steps of the trailer backup assist system 10 as disclosed herein.

In parallel with performing the operations for receiving the trailer backup assist requests, determining the desired reference path 26 and curvature of the trailer 12, and generating the vehicle steering commands, the trailer backup assist system 10 may perform an operation for monitoring if an unacceptable trailer backup condition exists. Examples of such monitoring include, but are not limited to assessing a hitch angle $\gamma$ to determine if a hitch angle $\gamma$ threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from the wheel speed information obtained from one or more wheel speed sensors 58 of the vehicle 14. If it is determined that an unacceptable trailer backup condition exists, an operation may be performed for causing the current path of travel of the trailer 12 to be inhibited (e.g., stopping motion of the vehicle 14), followed by the operation being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations. Otherwise, the method can proceed to operation for ending the current trailer backup assistance. In conjunction with performing the operation for ending the current trailer backup assistance, an operation can be performed for controlling movement of the vehicle to correct or limit a jackknife condition (e.g., steering the vehicle, decelerating the vehicle, limiting magnitude and/or rate of driver requested trailer curvature input, limiting magnitude and/or rate of the steering command, and/or the like to preclude the hitch angle from being exceeded).

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method for reversing a trailer with a vehicle, comprising:
    placing the vehicle and trailer in a static orientation;
    providing a mode selection device for selecting between a trailer straight routine and a vehicle straight routine;
    based on the selection, generating a reference path in line with longitudinal direction of the trailer or vehicle in the static orientation; and
    autonomously steering the vehicle to guide the trailer on the reference path.

2. The method of claim 1, wherein if the trailer straight routine is selected, the reference path is in line with the longitudinal direction of the trailer in the static orientation, and wherein if the vehicle straight routine is selected, the reference path is in line with the longitudinal direction of the vehicle in the static orientation.

3. The method of claim 2, further comprising generating steering commands to place the longitudinal direction of the vehicle and trailer on the reference path if the trailer straight routine is selected and the longitudinal direction of the vehicle is misaligned with the generated reference path.

4. The method of claim 2, further comprising generating steering commands to place the longitudinal direction of the vehicle and trailer on the reference path if the vehicle straight routine is selected and the longitudinal direction of the trailer is misaligned with the generated reference path.

5. The method of claim 1, further comprising providing a steering input device for adjusting the reference path.

6. The method of claim 1, wherein the vehicle is steered based on a sensed hitch angle and a kinematic relationship between the vehicle and trailer, wherein the kinematic relationship includes a length of the trailer, a wheelbase of the vehicle, and a distance from a hitch connection to a rear axle of the vehicle.

7. A method for reversing a trailer with a vehicle, comprising:
    providing a mode selection device for selecting between a trailer straight routine, a vehicle straight routine, and a curvature routine;
    based on the selection, generating a reference path in line with a longitudinal direction of the trailer or vehicle in a static orientation, or based on a hitch angle between the trailer and vehicle in the static orientation; and steering the vehicle to guide the trailer on the reference path.

8. The method of claim 7, wherein a backup maneuver is defined by reversing movement of the vehicle from the static orientation, and wherein the vehicle is steered in the backup maneuver to guide the trailer on the reference path.

9. The method of claim 8, further comprising:
determining an orientation of the trailer relative to the reference path in the backup maneuver based on the hitch angle, a steering angle of the vehicle, and a wheel speed of the vehicle.

10. The method of claim 9, wherein the orientation of the trailer relative to the reference path is used to generate a steering angle command for the vehicle to guide the trailer on the reference path.

11. The method of claim 7, wherein if the trailer straight routine is selected, the reference path is in line with the longitudinal direction of the trailer in the static orientation, wherein if the vehicle straight routine is selected, the reference path is in line with the longitudinal direction of the vehicle in the static orientation, and wherein if the curvature routine is selected, the reference path is based on the hitch angle.

12. The method of claim 11, further comprising generating steering commands to place the longitudinal direction of the vehicle and trailer on the reference path if the trailer straight routine is selected and the longitudinal direction of the vehicle is misaligned with the generated reference path.

13. The method of claim 11, further comprising generating steering commands to place the longitudinal direction of the vehicle and trailer on the reference path if the vehicle straight routine is selected and the longitudinal direction of the trailer is misaligned with the generated reference path.

14. The method of claim 11, further comprising generating steering commands to place the vehicle and trailer on the reference path if the curvature routine is selected, wherein the reference path is a circulatory path defined by the hitch angle.

15. The method of claim 7, further comprising providing a steering input device for adjusting the reference path.

16. A trailer backup assist system, comprising:
a mode selection device for selecting between a trailer straight routine and a vehicle straight routine; and
a controller generating a reference path based on the selection and in line with a longitudinal direction of the trailer or vehicle in a static orientation, the controller further generating a steering command to the vehicle when reversing to guide the trailer on the reference path.

17. The trailer backup assist system of claim 16, further comprising:
a positioning device determining a position of the trailer relative to the reference path for generating the steering angle command to guide the trailer on the reference path.

18. The trailer backup assist system of claim 17, wherein the position of the trailer relative to the reference path is determined based on a hitch angle between the trailer and vehicle, a steering angle of the vehicle, and a wheel speed of the vehicle.

19. The trailer backup assist system of claim 16, wherein the controller determines a kinematic relationship of the trailer and the vehicle based on a length of the trailer and a wheelbase of the vehicle, whereby the steering command is generated based on the kinematic relationship.

20. The trailer backup system of claim 16, wherein a curvature routine is selectable using the mode selection device, wherein if the trailer straight routine is selected, the reference path is in line with the longitudinal direction of the trailer in the static orientation, wherein if the vehicle straight routine is selected, the reference path is in line with the longitudinal direction of the vehicle in the static orientation, and wherein if the curvature routine is selected, the reference path is based on a hitch angle between the trailer and vehicle.

* * * * *